United States Patent
Reynolds et al.

(10) Patent No.: US 9,790,326 B2
(45) Date of Patent: Oct. 17, 2017

(54) METHOD FOR PREPARING DIOXYHETEROCYCLE-BASED ELECTROCHROMIC POLYMERS

(71) Applicants: University of Florida Research Foundation, Inc., Gainesville, FL (US); Georgia Tech Research Corporation, Atlanta, GA (US)

(72) Inventors: John R. Reynolds, Dunwoody, GA (US); Leandro Estrada, Decatur, GA (US); James Deininger, Highland Heights, OH (US); Frank Antonio Arroyave-Mondragon, Valencia (ES)

(73) Assignees: UNIVERSITY OF FLORIDA RESEARCH FOUNDATION, INC., Gainesville, FL (US); GEORGIA TECH RESEARCH CORPORATION, Atlanta, GA (US)

( * ) Notice: Subject to any disclaimer, the term of this patent is extended or adjusted under 35 U.S.C. 154(b) by 0 days.

(21) Appl. No.: 14/897,063

(22) PCT Filed: Jun. 18, 2014

(86) PCT No.: PCT/US2014/042844
§ 371 (c)(1),
(2) Date: Dec. 9, 2015

(87) PCT Pub. No.: WO2014/205024
PCT Pub. Date: Dec. 24, 2014

(65) Prior Publication Data
US 2016/0122476 A1    May 5, 2016

Related U.S. Application Data

(60) Provisional application No. 61/836,206, filed on Jun. 18, 2013.

(51) Int. Cl.
  *C08G 75/00*   (2006.01)
  *C08G 75/06*   (2006.01)
  (Continued)

(52) U.S. Cl.
  CPC ........... *C08G 75/06* (2013.01); *C08G 61/126* (2013.01); *C08G 75/00* (2013.01); *C08G 75/32* (2013.01);
  (Continued)

(58) Field of Classification Search
  CPC ........ C08G 75/00; C08G 75/06; C08G 75/32; C08G 61/12; H01L 51/00; C09K 11/00; H01B 1/00
  See application file for complete search history.

(56) References Cited

U.S. PATENT DOCUMENTS

| | | | | |
|---|---|---|---|---|
| 4,924,000 A | * | 5/1990 | Hesse | .................. C07D 233/64 548/333.5 |
| 2010/0298527 A1 | * | 11/2010 | Beaujuge | ............ C08G 61/123 528/380 |

(Continued)

FOREIGN PATENT DOCUMENTS

| | | |
|---|---|---|
| JP | 2016 199658 | 12/2016 |
| WO | WO 2011/075664 | 6/2011 |

(Continued)

OTHER PUBLICATIONS

Wang et al. J. Am. Chem. Soc. 2010, 132, 11420-11421.*
(Continued)

*Primary Examiner* — Shane Fang
(74) *Attorney, Agent, or Firm* — Saliwanchik, Lloyd & Eisenschenk

(57) ABSTRACT

A method for preparing a conjugated polymer involves a DHAP polymerization of a 3,4-dioxythiophene, 3,4-dioxyfuran, or 3,4-dioxypyrrole and, optionally, at least one
(Continued)

a)

b)

second conjugated monomer in the presence of a Pd or Ni comprising catalyst, an aprotic solvent, a carboxylic acid at a temperature in excess of 120° C. At least one of the monomers is substituted with hydrogen reactive functionalities and at least one of the monomers is substituted with a Cl, Br, and/or I. The polymerization can be carried out at temperature of 140° C. or more, and the DHAP polymerization can be carried out without a phosphine ligand or a phase transfer agent. The resulting polymer can display dispersity less than 2 and have a degree of polymerization in excess of 10.

20 Claims, 6 Drawing Sheets

(51) Int. Cl.
C08G 75/32 (2006.01)
C09K 11/00 (2006.01)
H01B 1/00 (2006.01)
C08G 61/12 (2006.01)

(52) U.S. Cl.
CPC ............... C09K 11/00 (2013.01); H01B 1/00 (2013.01); *C08G 2261/1412* (2013.01); *C08G 2261/1424* (2013.01); *C08G 2261/3223* (2013.01); *C08G 2261/3243* (2013.01); *C08G 2261/41* (2013.01); *C08G 2261/54* (2013.01)

(56) References Cited

U.S. PATENT DOCUMENTS

| 2011/0003967 | A1* | 1/2011 | Amb | C08G 61/122 528/380 |
|---|---|---|---|---|
| 2012/0108778 | A1 | 5/2012 | Amb et al. | |
| 2014/0142263 | A1* | 5/2014 | Lee | C08G 61/122 526/171 |
| 2014/0371409 | A1* | 12/2014 | Leclerc | C08G 61/126 526/171 |

FOREIGN PATENT DOCUMENTS

| WO | WO 2013/056355 | 4/2013 |
| WO | WO 2015/154190 | 10/2015 |

OTHER PUBLICATIONS

Chang, S-W. et al., "Pd-Catalysed Direct Arylation Polymerisation for Synthesis of Low-Bandgap Conjugated Polymers and Photovoltaic Performance," *Macromolecular Rapid Communications*, 2012, pp. 1927-1932, vol. 33.

Fujinami, Y. et al., "Synthesis of Thiophene- and Bithiophene-Based Alternating Copolymers via Pd-Catalyzed Direct C-H Arylation," *ACS Macro Lett.*, 2012, pp. 67-70, vol. 1.

Jensen, J. et al., "Manufacture and Demonstration of Organic Photovoltaic-Powered Electrochromic Displays Using Roll Coating Methods and Printable Electrolytes," *Journal of Polymer Science Part B: Polymer Physics*, 2012, pp. 536-545, vol. 50.

Kowalski, S. et al., "Synthesis of Poly(4,4-dialkyl-cyclopenta[2,1-b:3,4-b']dithiophene-alt-2,1,3-benzothiadiazole) (PCPDTBT) in a Direct Arylation Scheme," *ACS Macro Lett.*, 2012, pp. 465-468, vol. 1.

Kuwabara, J. et al., "Direct arylation polycondensation for the synthesis of bithiophene-based alternating copolymers," *Polym. Chem.*, 2013, pp. 947-953, vol. 4.

Lu, W. et al., "Synthesis of 4,4'-dinonyl-2,2'-bithiazole-based copolymers via Pd-catalyzed direct C-H arylation," *Polym. Chem.*, 2012, pp. 3217-3219, vol. 3.

Rudenko, A.E. et al., "Semi-Random P3HT Analogs via Direct Arylation Polymerization," *Journal of Polymer Science Part A: Polymer Chemistry*, 2012, pp. 3691-3697, vol. 50.

Sinha, J. et al., "Tetrathiafulvalene (TTF)-Functionalized Thiophene Copolymerized with 3,3-'''-Didodecylquaterthiophene: Synthesis, TTF Trapping Activity, and Response to Trinitrotoluene," *Macromolecules*, 2013, pp. 708-717, vol. 46.

Tan, Y. et al., "Assessment of the Intermediacy of Arylpalladium Carboxylate Complexes in the Direct Arylation of Benzene: Evidence for C-H Bond Cleavage by "Ligandless" Species," *J. Am. Chem. Soc.*, 2011, pp. 3308-3311, vol. 133.

Yamazaki, K. et al., "Detailed Optimization of Polycondensation Reaction via Direct C-H Arylation of Ethylenedioxythiophene," *Macromol. Rapid Commun.*, 2013, pp. 69-73, vol. 34.

Zhou, H. et al., "Facile Syntheses of Dioxythiophene-Based Conjugated Polymers by Direct C-H Arylation," *Macromolecules*, 2012, pp. 7783-7790, vol. 45.

Baghbanzadeh, M. et al., "Palladium-Catalyzed Direct Arylation of Heteroaromatic Compounds: Improved Conditions Utilizing Controlled Microwave Heating," *The Journal of Organic Chemistry*, 2011, pp. 8138-8142, vol. 76, No. 19.

Beaujuge, P. et al., "Color Control in π-Conjugated Organic Polymers for Use in Electrochromic Devices," *Chemical Reviews*, 2010, pp. 268-320, vol. 110, No. 1.

Kiebooms, R. et al., "Synthesis, Electrical, and Optical Properties of Conjugated Polymers," *Handbook of Advanced Electronic and Photonic Materials and Devices*, Jan. 2001, pp. 1-102, vol. 8.

* cited by examiner

*a)*

*b)*

METHOD FOR PREPARING DIOXYHETEROCYCLE-BASED ELECTROCHROMIC POLYMERS

CROSS-REFERENCE TO RELATED APPLICATIONS

This application is the U.S. national stage application of International Patent Application No. PCT/US2014/042844, filed Jun. 18, 2014, which claims the benefit of U.S. Provisional Application Ser. No. 61/836,206, filed Jun. 18, 2013, the disclosures of which re hereby incorporated by reference in their entireties, including any figures, tables, or drawings.

This invention was made with government support under FA9550-09-1-0320, N00014-11-1-0245, and DE-FG0203ER15484 awarded by the United States Air Force, United States Navy and the United States Department of Energy. The government has certain rights in the invention.

BACKGROUND OF INVENTION

The organic electronics community has benefited tremendously from the development of palladium-catalyzed cross-coupling reactions, which offer facile access to a wide range of chemical structures that would otherwise be challenging to achieve. This capability has enabled structure-property relationship studies that provide design parameters for useful organic materials. Improved processability of organic materials encourages these routes because replacement of inorganic semiconductors with organic surrogates has the potential to decrease device fabrication costs significantly. The Pd catalyzed direct arylation of halides or pseudo-halides or their derivatives has been rapidly developing to the point where only minute amounts of undesired side products are generated upon coupling. While the mechanistic details of the Pd insertion to the activated C—H bond are not fully understood, successful protocols have been developed for the coupling of thienyl-based molecules to a wide variety of organic halides.

Dehydrogenative cross-coupling is an attractive method to carry out the synthesis of thiophene-based conjugated polymers. This direct heteroarylation polymerization (DHAP) leads to more easily prepared conjugated polymers than those from standard Suzuki and Stille polymerizations. The absence of phosphine in the reaction mixture avoids any phosphine incorporation into the polymer backbone, which complicates polymer purification. The residual contaminants left in conjugated polymers are associated with poor performances of electronic devices therefrom. Impurities from catalysts, such as those comprising Sn, Pd, and Br, can act as charge trapping sites that hamper efficient charge transport processes. Therefore, minimization or avoidance of such impurities is critical for many applications of these polymers. To this end, the preparation of electrochromic polymers including donor-acceptor DA copolymers by the DHAP method is attractive.

BRIEF SUMMARY

Embodiments of the invention are directed to the preparation of conjugated polymer by the transition metal catalyzed direct arylation of halides or pseudo-halides. The conjugated polymers are formed from the condensation of a first monomer that can be at least one of a 3,4-dioxythiophene, 3,4-dioxyselenophene, 3,4-dioxytellurophene, 3,4-dioxyfuran, or 3,4-dioxypyrrole and, optionally, one or more second conjugated monomers. The polymerization is carried out temperatures in excess of 120° C., for example, 150° C. and can be carried out without ligands or additives that are often employed in direct arylation reactions. The resulting conjugated polymers display relatively narrow molecular weight dispersities with molecular weights that are equivalent to or higher than the same polymers prepared by other methods, generally having significantly fewer amounts of impurities in the polymers than those by other methods. The monomers employed can be those that provide a single repeating unit to the resulting polymer or can be oligomeric in nature and provide a sequence of repeating units to the resulting polymer.

DETAILED DISCLOSURE

Figure 1:
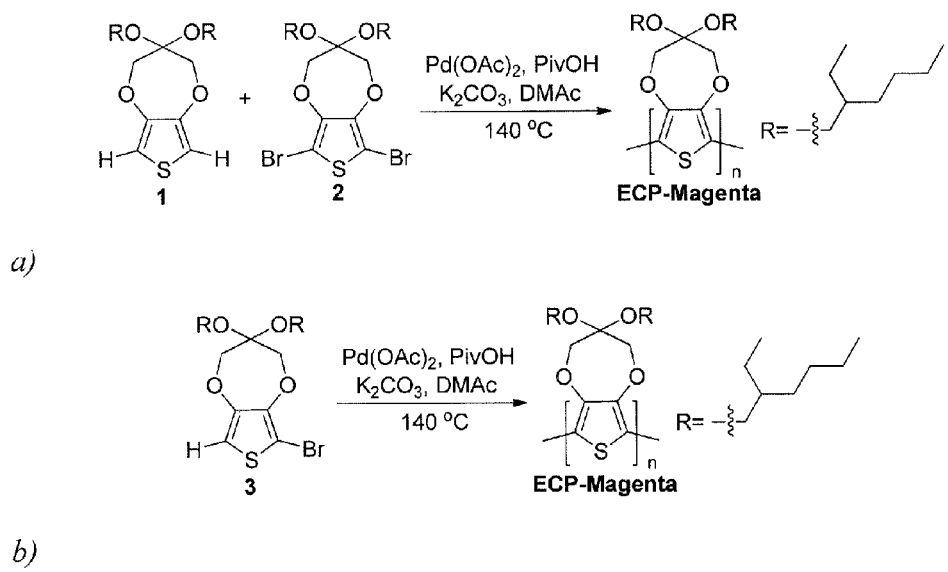
FIG. 1 shows a reaction scheme for the preparation of ECP-Magenta with FIG. 1A showing a pair of complementary monomers and FIG. 1B showing a self-complementary monomer, according to an embodiment of the invention.

Embodiments of the invention are directed to an improved method of preparing electrochromic homopolymers and copolymers. The method decreases the number of steps required for the synthesis of 3,4-dioxythiophene-based electrochromic polymers or other dioxyheterocyclic based conjugated polymers, and reduces the amount of many impurities that potentially affect the performance of the polymers. The method involves a direct (hetero)arylation polymerization (DHAP) between an aromatic monomer in a hydrogen form and a halogen substituted aromatic monomer, where at least one of the aromatic monomers is a dioxyheterocyclic aromatic monomer, for example, a 3,4-propylenedioxythiophene comprising monomer. The method involves the use of a transition metal catalyst, such as Pd or Ni catalyst, for example, palladium acetate, and an acid scavenger, for example potassium carbonate, in an aprotic solvent, for example, the polar aprotic solvent dimethylacetamide (DMAc). In an embodiment of the invention, the polymerization mixture is free of added ligand, for example, is free of a phosphine ligand. In an embodiment of the invention, the polymerization is carried out at a temperature in excess of 120° C., for example, 140° C. Advantageously, the method affords resulting polymers that display a narrower molecular weight distribution than does the equivalent polymer prepared at lower temperatures and distributions that are equivalent or lower than the equivalent polymer prepared by alternative synthetic routes, such as Grignard metathesis (GRIM), Stille coupling, Suzuki coupling, or oxidative polymerization (OxP). Therefore, a quality polymer can be prepared with few impurities, particularly metallic impurities, without extensive, costly, and time-consuming purification steps.

Advantageously, the catalyst is used at a level that is less than 5 mole percent of the monomer concentration, for example, less than 4 mole percent, less than 3 mole percent, less than 2 mole percent, or less than 1 mole percent. The catalyst must be present in at least 0.0001 mole percent. The Pd catalyst can be provided in the form of palladium diacetate, palladium di-trifluoroacetate, bis(dibenzylideneacetone)palladium(0), or other source of Pd known as a catalyst or precatalyst for a cross-coupling reaction such as a Negishi, Suzuki, Stille, Heck, Sonogashira, or Buchwald-Hartwig reaction, in addition to direct aromatic coupling reactions. Ni catalyst can be provided in the form of nickel acetate, bis(dibenzylideneacetone)nickel(0), nickel acetylacetonate, or other source of Ni known as a catalyst or precatalyst for a cross-coupling reaction such as Kumada or Grignard metathesis reaction, in addition to direct aromatic coupling reactions. In an embodiment of the invention, the transition metal source is free of a phosphine ligand. The reaction is performed in the presence of pivalic acid or other aliphatic carboxylic acid. The reaction is carried out in an aprotic solvent, generally, but not necessarily a polar solvent, for example, a solvent with a dielectric constant in excess of 25. Furthermore, the solvent has a boiling point in excess of the polymerization temperature, for example, above 150° C., at the pressure that the polymerization is carried out. For example, the solvent can have a boiling point in excess of 150° C. for a reaction carried out at one atmosphere of pressure, such that the reaction can be carried out without a significant build in pressure up to 150° C. Solvents that can be employed include, but are not limited to dimethylformamide (DMF), DMAc, N-methylpyrolidone (NMP), hexamethylphosporamide (HMPA), dimethylsulfoxide (DMSO), and propylene carbonate.

In embodiments of the invention, the monomer mixture comprises at least one first monomer that is a 3,4-dioxythiophene, 3,4-dioxyselenophene, 3,4-dioxytellurophene, 3,4-dioxyfuran, or 3,4-dioxypyrrole of the structure:

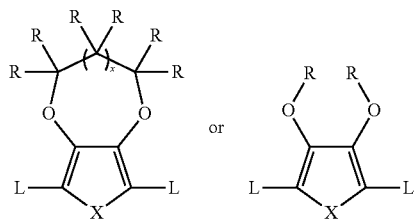

where x is 0 to 3; L is independently H, Cl, Br, I, OTs, OTf, CN, OCN, SCN, or any other pseudohalide, X is S, Se, Te, O, or NR; R is independently H, alkyl, aryl, substituted alkyl, or substituted aryl, oligoether, aminoalkyl, hydroxyalkyl, alkoxyalkyl, acyloxyalkyl, $HOS(O)_2$alkyl, $HOC(O)$alkyl, $(HO)_2P(O)$alkyl, aminoaryl, hydroxyaryl, alkoxyaryl, acyloxyaryl, $HOS(O)_2$aryl, $HOC(O)$aryl or $(HO)_2P(O)$aryl, —$(CH_2)_m$—$YC(O)R^2$, —$(CH_2)_m$—$C(O)YR^2$, —$(CH_2)_m$—O—$(CH_2)_v$$YC(O)R^2$, —$(CH_2)_m$—O—$(CH_2)_v$$C(O)YR^2$, —$(CH_2)_m$—$OCH_z(CH_3)_y[(CH_2)_w YC(O)R^2]_{3-z}$, —$(CH_2)_m$—$OCH_z(CH_3)_y[(CH_2)_w C(O)YR^2]_{3-z}$, or two R groups on adjacent carbons in combination are alkylene, arylene, substituted alkylene, or substituted arylene; m is 1 to 8; y is 0 to 2; z is 0 to 2; y+z is 0 to 2; w is 1 to 8; v is 2 to 8; Y is O, S, or $NR^3$, $R^2$ is a straight chained, branched chain, cyclic or substituted cyclic alkyl group of 1 to 12 carbons; and $R^3$ is a straight chained, branched chain, cyclic or substituted cyclic alkyl group of 1 to 6 carbons.

Alkyl is a straight or branched chain of, for example, 1-24 carbon atoms and is, for example, methyl, ethyl, n-propyl, n-butyl, sec butyl, tert-butyl, n-hexyl, n-octyl, 2-ethylhexyl, n-nonyl, n-decyl, n-undecyl, n-dodecyl, n-tridecyl, n-tetradecyl, n-hexadecyl, n-octadecyl or dodecanyl and the like. Alkylene is a chain of, for example, 1-12 carbon atoms and is, for example, methylene, ethylene, propylene, butylene, pentalene, hexylene, octylene, 2-ethylhexyl, n-nonyl, n-decylene or dodecylene and the like; for example, methylene, ethylene, propylene or butylene. The alkyl or alkylene may be interrupted, one or more times, by one or more oxygen atoms, sulfur atoms, —SO—, —$SO_2$—, carbonyl, —COO—, —CONH—, —NH—, —CON($C_{1-8}$ alkyl)- or —N($C_{1-8}$ alkyl)- and the like. For example, the alkyl group may be interrupted, one or more times, by one or more oxygen atoms, sulfur atoms, carbonyl, —COO—, —NH— or —N($C_{1-8}$ alkyl)-. The uninterrupted or interrupted alkyl or alkylene may also be substituted, one or more times, by one or more $C_{3-6}$ cycloalkyl groups, halogen, —OR, —COOR, —COOM, —$SO_3$M, —$SO_3$H, phosphonic acid, halogen, —$CONR^8_2$, —$NR^8_2$, phosphonate salt, ammonium salt or group of the formulae —Z—Ar or —C(O)—Z—Ar wherein M is a nitrogen cation or metal cation, $R^8$ is independently hydrogen; a group —Z—Ar, —C(O)—Z—Ar, or —C(O)—O—Z—Ar; $C_{1-24}$ alkyl, $C_{3-24}$ alkenyl, $C_{3-6}$ cycloalkyl or $C_{1-24}$ alkylcarbonyl which is uninterrupted or interrupted, one or more times, by one or more oxygen atoms, sulfur atoms, carbonyl, —COO—, —CONH—, —NH—, —CON($C_{1-8}$ alkyl)- or —N($C_{1-8}$ alkyl)-, where uninterrupted or interrupted alkyl, alkenyl, cycloalkyl or alkylcarbonyl are unsubstituted or substituted, one or more times, by one or more halogen, —OH, $C_{7-12}$ aralkyl, $C_{2-12}$ alkylcarbonyl, $C_{1-24}$ alkoxy, $C_{2-24}$ alkylcarboxy, —COOM, —$CONH_2$, —CON(H)($C_{1-8}$ alkyl), —CON($C_{1-8}$ alkyl)$_2$, —$NH_2$, —N(H)($C_{1-8}$ alkyl), —N($C_{1-8}$ alkyl)$_2$, —$SO_3$M, phenyl, phenyl substituted, one or more times, by one or more $C_{1-8}$ alkyl, naphthyl, naphthyl substituted, one or more times, by one or more $C_{1-8}$ alkyl ammonium salt, phosphonic acid or phosphonate salt or when attached to a nitrogen atom, R and R', together with the nitrogen atom to which they are attached, form a 5-, 6- or 7-membered ring that is uninterrupted or interrupted by —O—, —NH— or —N($C_{1-12}$ alkyl)-; Z is a direct bond or $C_{1-12}$ alkylene that is uninterrupted or interrupted by one or more oxygen atoms and is unsubstituted or substituted, one or more times, by one or more —OH, halogen, $C_{1-8}$ alkyl, $C_{1-24}$ alkoxy, $C_{2-24}$alkylcarboxy, —$NH_2$, —N(H)($C_{1-8}$ alkyl), —N($C_{1-8}$ alkyl)$_2$ or ammonium salt; Ar is $C_{6-10}$ aromatic or $C_{1-9}$ saturated or unsaturated heterocycle that is unsubstituted or substituted, one or more times, by one or more halogen, —OH, $C_{1-24}$ alkoxy, $C_{2-24}$ alkylcarboxy, —COOQ-$CONH_2$, —CON(H)($C_{1-8}$ alkyl), —CON($C_{1-8}$ alkyl)$_2$, —$NH_2$, N(H)($C_{1-8}$ alkyl), —N($C_{1-8}$ alkyl)$_2$, —$SO_3M$, $SO_3H$, ammonium salt, phosphonic acid, phosphonate salt, $C_{1-24}$ alkyl that is unsubstituted or substituted, one or more times, by one or more halogen, wherein Q is hydrogen, metal cation, glycol ether, phenyl or benzyl, or phenyl or benzyl substituted, one or more times, by one or more halogen, hydroxy, $C_{1-24}$ alkoxy or $C_{1-12}$ alkyl.

Additionally, alkylene or interrupted alkylene may also be substituted by a group —Z—Ar, —C(O)—Z—Ar, or —C(O)—O—Z—Ar; $C_{1-24}$ alkyl, $C_{3-6}$ cycloalkyl or $C_{1-24}$ alkylcarbonyl that is uninterrupted or interrupted, one or more times, by one or more oxygen atoms, sulfur atoms, carbonyl, —COO—, —CONH—, —NH—, —CON($C_{1-8}$ alkyl)- or —N($C_{1-8}$ alkyl)- that is uninterrupted or interrupted alkyl, cycloalkyl or alkylcarbonyl and is unsubstituted or substituted, one or more times, by one or more halogen, —OH, $C_{7-12}$ aralkyl, $C_{2-12}$ alkylcarbonyl, $C_{1-24}$ alkoxy, $C_{2-24}$ alkylcarboxy, —COOM, —$CONH_2$, —CON(H)($C_{1-8}$ alkyl), —CON($C_{1-8}$ alkyl)$_2$, —$NH_2$, —N(H)($C_{1-8}$ alkyl), —N($C_{1-8}$ alkyl)$_2$, —$SO_3M$, phenyl, phenyl substituted, one or more times, by one or more $C_{1-8}$ alkyl, naphthyl, naphthyl substituted, one or more times, by one or more $C_{1-8}$ alkyl, ammonium salt, phosphonic acid or phosphonate salt or when attached to a nitrogen atom, R and R', together with the nitrogen atom to which they are attached, form a 5-, 6- or 7-membered ring that is uninterrupted or interrupted by —O—, —NH— or —N($C_{1-12}$ alkyl)-.

In embodiments of the invention, the 3,4-dioxythiophene, 3,4-dioxyselenophene, 3,4-dioxytellurophene, 3,4-dioxyfuran, or 3,4-dioxypyrrole first monomer is co-polymerized with one or more second monomers. The second monomer is a substituted or unsubstituted conjugated monomer or oligomer bearing a pair of L=H, Cl, Br, I, OTs, OTf, CN, OCN, SCN, or any pseudohalides at appropriate positions. The second monomer can be, for example but not limited to, ethene, carbazole, fluorene, benzothiadiazole, thiadiazoloquinoxaline, quinoline, quinoxaline, thienothiadiazole, thienopyrazine, pyrazinoquinoxaline, benzobisthiadiazole, thiadiazolothienopyrazine, thiophene, pyrrole, furan, selenophene, telurophene, thieno[3,2-b]thiophene, dithieno[3,2-b:2',3'-d]thiophene, benzo[c][1,2,5]thiadiazole, benzo[c][1,2,5]-oxadiazole, benzo[d][1,2,3]triazole, pyrido[3,4-b]pyrazine, cyanovinylene, thiazolo[5,4-d]thiazole, 1,3,4-oxadiazole, 1,3,4-thiadiazole, 1,3,4-triazole, pyrrolo[3,4-c]pyrrole-1,4-dione, 2,2'-bithiazole, [1,2,5]thiadiazole-[3,4-c]pyridine, thieno[3,4-b]pyrazine, [1,2,5]oxadiazolo[3,4-c]pyridine, dicyanovinylene, benzo[1,2-c;4,5-c']bis[1,2,5]thiadiazole, [1,2,5]thiadiazolo-[3,4-g]quinoxaline, cyclopentadithiophene-4-one, 4-dicyano-methylenecyclopentadithiolene, benzo[c]thiophene, isoindigo, indigo, 4,4'-bis(alkyl)-[6,6'-bithieno[3,2-b]pyrrolylidene]-5,5'(4H,4'H)-dione (a.k.a. dithienoketopyrrole or thienoisoindigo), phenanthrene, phenanthrene-9,10-dione, benzo[1,2-b:6,5-b']dithiophene-4,5-dione, napthalenediimide, perylenediimide, any aromatic of the structure:

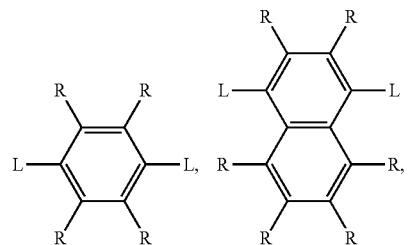

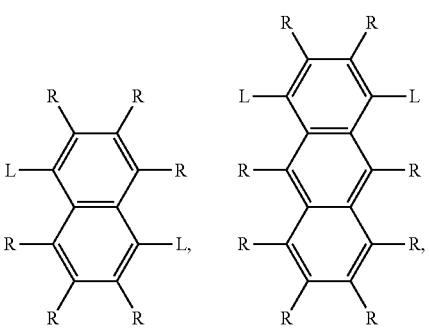

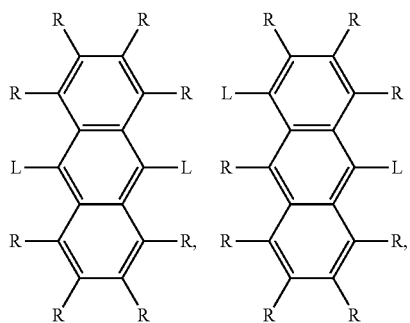

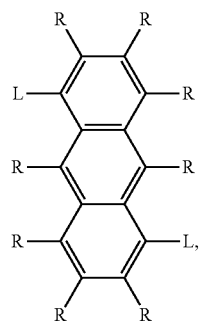

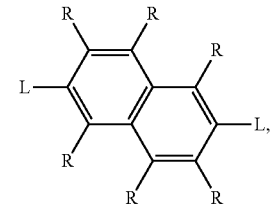

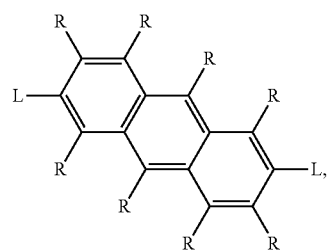

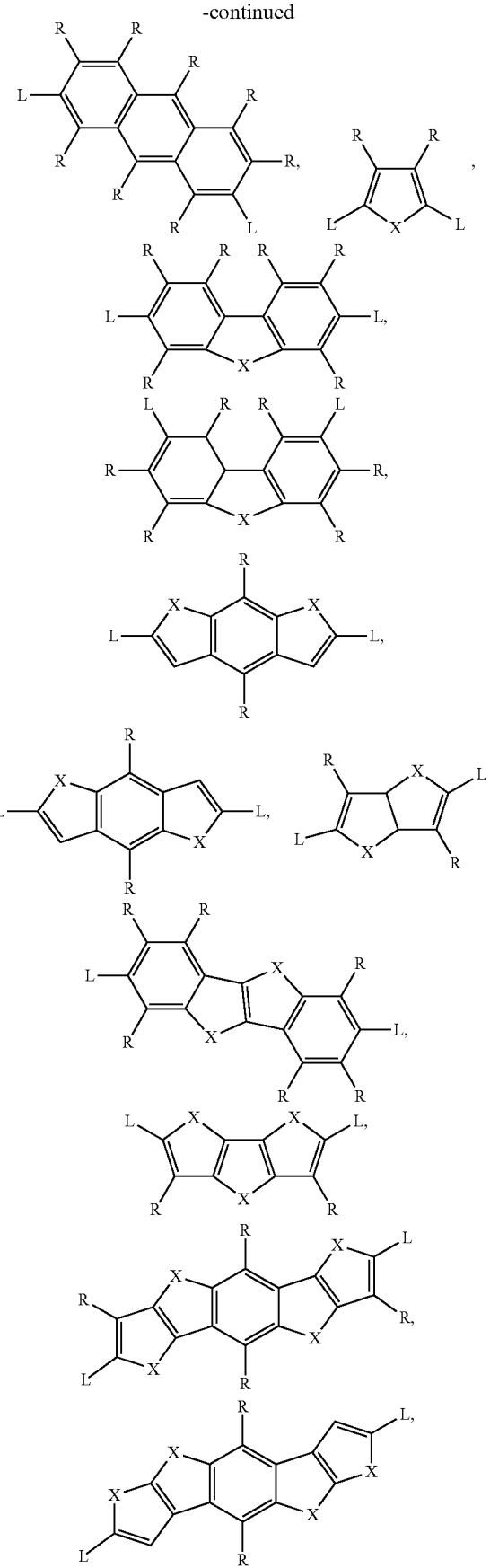
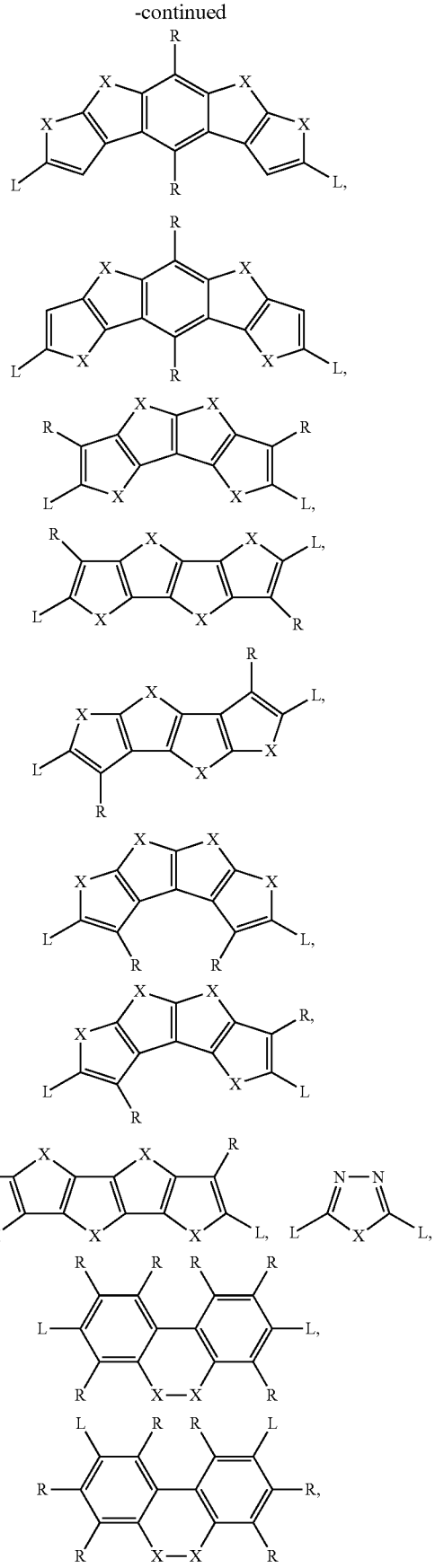

-continued
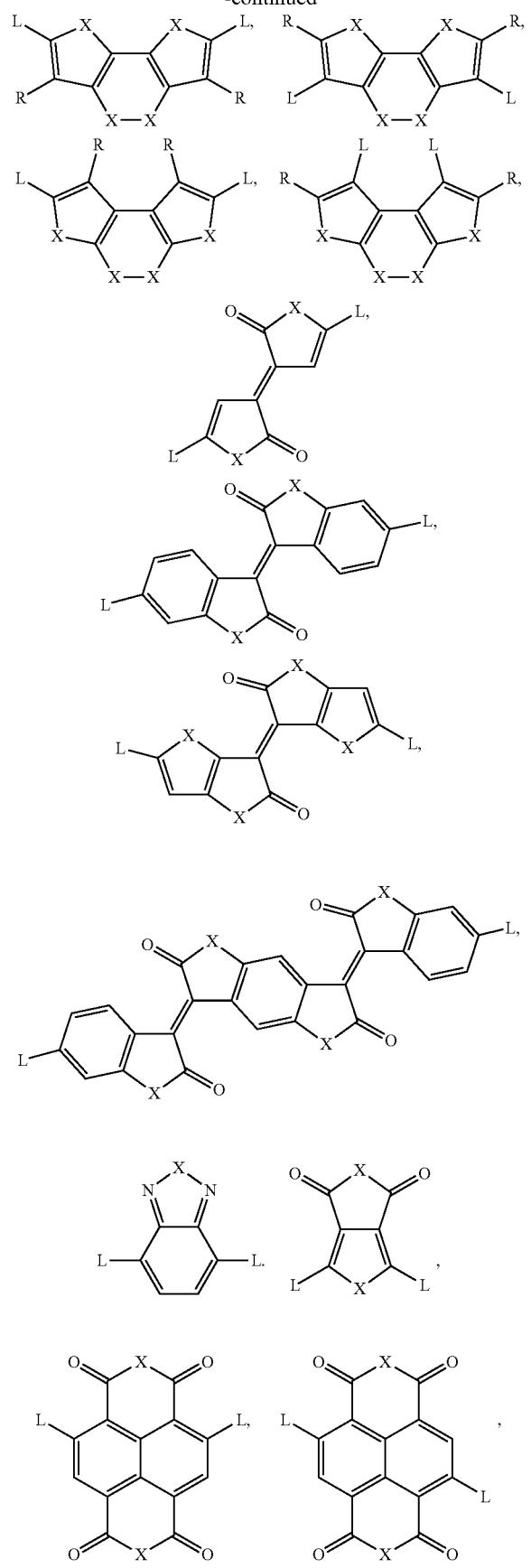
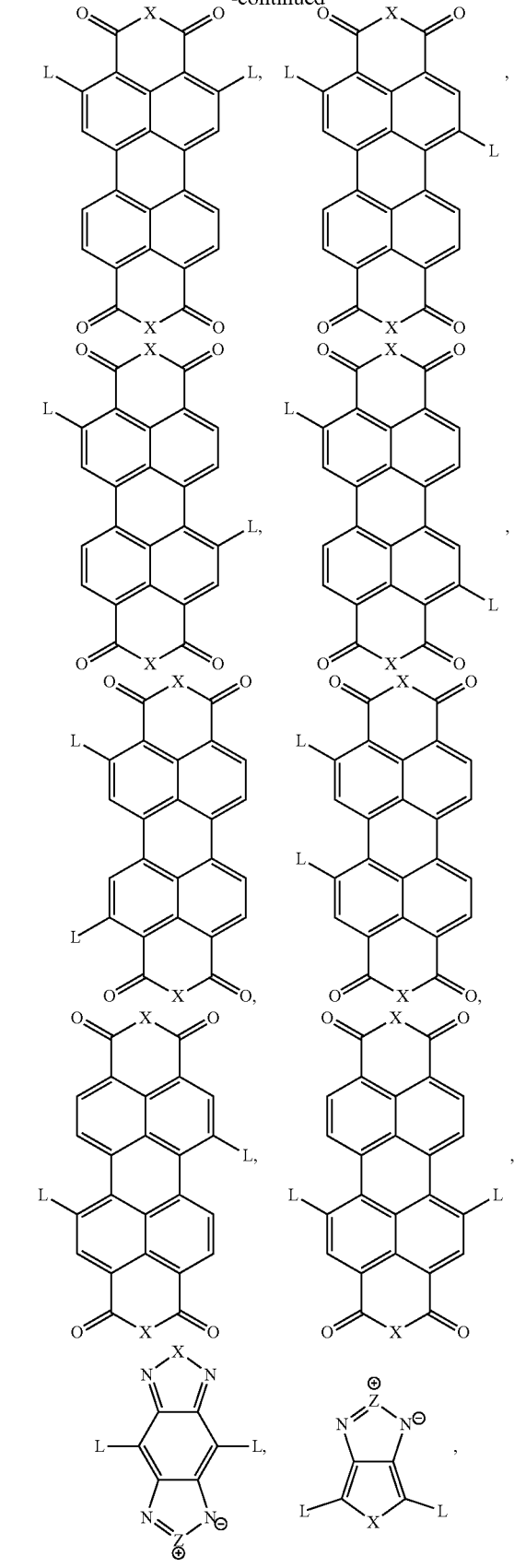
or any oligomers thereof.

where: L is independently H, Cl, Br, I, OTs, OTf, CN, OCN, SCN, or other pseudohalide; X is NR', PR', S, O, Se, Te, CR$_2$, SiR'$_2$, GeR'$_2$, BR', or SO$_x$ where x=1 or 2; Z is NR', PR', S, O, Se, or Te; R' is independently H, C$_1$-C$_{30}$ alkyl, C$_2$-C$_{30}$ alkenyl, C$_2$-C$_{30}$ alkynyl, C$_6$-C$_{14}$ aryl, C$_7$-C$_{30}$ arylalkyl, C$_8$-C$_{30}$ arylalkenyl, C$_8$-C$_{30}$ arylalkynyl, C$_1$-C$_{30}$ hydroxyalkyl, C$_6$-C$_{14}$ hydroxyaryl, C$_7$-C$_{30}$ hydroxyarylalkyl, C$_3$-C$_{30}$ hydroxyalkenyl, C$_3$-C$_{30}$ hydroxyalkynyl, C$_8$-C$_{30}$ hydroxyarylalkenyl, C$_8$-C$_{30}$ hydroxyarylalkynyl, C$_3$-C$_{30}$ polyether, C$_3$-C$_{30}$ polyetherester, C$_3$-C$_{30}$ polyester, C$_3$-C$_{30}$ polyamino, C$_3$-C$_{30}$ polyaminoamido, C$_3$-C$_{30}$ polyaminoether, C$_3$-C$_{30}$ polyaminoester, C$_3$-C$_{30}$ polyamidoester, C$_3$-C$_{30}$alkylsulfonic acid, C$_3$-C$_{30}$alkylsulfonate salt, C$_1$-C$_{30}$ alkylcarboxylate salt, C$_1$-C$_{30}$ alkylthiocarboxylate salt, C$_1$-C$_{30}$ alkyldithiocarboxylate salt or C$_3$-C$_{30}$ alkyl C$_1$-C$_4$ trialkyammonium salt; and R is independently H, C$_1$-C$_{30}$ alkyl, C$_2$-C$_{30}$ alkenyl, C$_2$-C$_{30}$ alkynyl, C$_6$-C$_{14}$ aryl, C$_7$-C$_{30}$ arylalkyl, C$_8$-C$_{30}$ arylalkenyl, C$_8$-C$_{30}$ arylalkynyl, hydroxy, CO$_2$H, C$_2$-C$_{30}$ alkylester, C$_7$-C$_{15}$ arylester, C$_8$-C$_{30}$ alkylarylester, C$_3$-C$_{30}$ alkenylester, C$_3$-C$_{30}$ alkynylester, NH$_2$, C$_1$-C$_{30}$ alkylamino, C$_6$-C$_{14}$ arylamino, C$_7$-C$_{30}$ (arylalkyl)amino, C$_2$-C$_{30}$ alkenylamino, C$_2$-C$_{30}$ alkynylamino, C$_8$-C$_{30}$ (arylalkenyl)amino, C$_8$-C$_{30}$ (arylalkynyl)amino, C$_2$-C$_{30}$ dialkylamino, C$_{12}$-C$_{28}$ diarylamino, C$_4$-C$_{30}$ dialkenylamino, C$_4$-C$_{30}$ dialkynylamino, C$_7$-C$_{30}$ aryl(alkyl)amino, C$_7$-C$_{30}$ di(arylalkyl)amino, C$_8$-C$_{30}$ alkyl(arylalkyl)amino, C$_{15}$-C$_{30}$ aryl(arylalkyl)amino, C$_8$-C$_{30}$ alkenyl(aryl) amino, C$_8$-C$_{30}$ alkynyl(aryl)amino C(O)NH$_2$ (amido), C$_2$-C$_{30}$ alkylamido, C$_7$-C$_{14}$ arylamido, C$_8$-C$_{30}$ (arylalkyl) amido, C$_2$-C$_{30}$ dialkylamido, C$_{12}$-C$_{28}$ diarylamido, C$_8$-C$_{30}$ aryl(alkyl)amido, C$_{15}$-C$_{30}$ di(arylalkyl)amido, C$_9$-C$_{30}$ alkyl (arylalkyl)amido, C$_{16}$-C$_{30}$ aryl(arylalkyl)amido, thiol, C$_1$-C$_{30}$ hydroxyalkyl, C$_6$-C$_{14}$ hydroxyaryl, C$_7$-C$_{30}$ hydroxyarylalkyl, C$_3$-C$_{30}$ hydroxyalkenyl, C$_3$-C$_{30}$ hydroxyalkynyl, C$_8$-C$_{30}$ hydroxyarylalkenyl, C$_8$-C$_{30}$ hydroxyarylalkynyl, C$_3$-C$_{30}$ polyether, C$_3$-C$_{30}$ polyetherester, C$_3$-C$_{30}$ polyester, C$_3$-C$_{30}$ polyamino, C$_3$-C$_{30}$ polyaminoamido, C$_3$-C$_{30}$ polyaminoether, C$_3$-C$_{30}$ polyaminoester, C$_3$-C$_{30}$ polyamidoester, C$_3$-C$_{30}$ alkylsulfonic acid, C$_3$-C$_{30}$alkylsulfonate salt, C$_1$-C$_{30}$ carboxylate salt, C$_1$-C$_{30}$ thiocarboxylate salt, C$_1$-C$_{30}$ dithiocarboxylate salt, or C$_3$-C$_{30}$ alkylC$_1$-C$_4$ trialkyammonium salt.

In an embodiment of the invention, L=hydrogen is, to the extent possible by normal methods of preparing polymerization mixtures, half of all L substituents of the first and/or optional second monomers combined into the polymerization mixture. In other embodiments of the invention a desired stoichiometric excess of hydrogen or non-hydrogen L substituents are included in the polymerization mixture to define the maximum degree of polymerization that can be achieved or to promote specific L substituents on as many of the polymer chain ends as possible. For purposes of the invention, a polymer has at least four repeating units, at least six repeating units, at least 10 repeating units, at least 15 repeating units, at least 20 repeating units, or at least 25 repeating units. For example, in a homopolymerization, the first monomer can be a single first monomer that has one hydrogen and one non-hydrogen L substituent. For example, in a homopolymerization, the first monomer can be a pair of monomers, one where both L groups are hydrogen and one where both L groups are non-hydrogen. For example, in a random copolymerization two different first monomers can have one hydrogen and one non-hydrogen L substituent. For example, in an alternating copolymerization a first monomer can have two hydrogen L substituents and an additional first monomer can have two non-hydrogen L substituents. In a quasi-random copolymerization, a portion of a first monomer can have two hydrogen L substituents and a portion of the first monomer can have two non-hydrogen L substituents, and an additional first monomer can have two hydrogen L substituents such that isolated monades of the additional first monomer are dispersed between random length sequences of the first monomer.

In an embodiment of the invention, a copolymerization of at least one first monomer and at least one second monomer can be carried out. For example, a regular copolymer with alternating first and second monomers can be carried out where, for example, the first monomer has hydrogen L substituents and the second monomer has non-hydrogen L substituents. For example, in a random copolymerization, the first monomer and second monomer each have one hydrogen and one non-hydrogen L substituents; or a mixture of first monomers, one with two hydrogen L substituents and another with two non-hydrogen L substituents, is copolymerized with a mixture of second monomers, one with two hydrogen L substituents and another with two non-hydrogen L substituents. In a quasi-random copolymerization, a portion of a first monomer can have two hydrogen L substituents and a portion of the first monomer can have two non-hydrogen L substituents, and second monomer can have two hydrogen or two non-hydrogen L substituents such that isolated monades of the second monomer are dispersed between random length sequences of the first monomer.

In an embodiment of the invention, a copolymerization may be carried out with a plurality of additions of monomers or by the combination of a plurality of polymerization mixtures to bias the repeating unit sequences of the first monomers and/or second monomers in the resulting copolymers. For example, a polymerization mixture of a first monomer with a stoichiometric excess of hydrogen L substituents to yield oligomers with only hydrogen L substituents can be combined with a polymerization mixture of a second monomer with a stoichiometric excess of non-hydrogen L substituents to yield oligomers with only non-hydrogen L substituents. In this manner, the sequence length of first monomers and sequence length of second monomers can be different from that of a copolymer with the same proportion of first and second monomers made by a single polymerization of the total mixture of first and second monomers in a single charge of monomers.

In an embodiment of the invention, the temperature of the polymerization is in excess of 120° C. The temperature can be maintained at or above, for example, 120° C., 125° C., 130° C., 135° C., 140° C., 145° C., or 150° C. Not only do these higher temperature promote a more rapid polymerization, but, surprisingly, the molecular weight distribution (dispersity) was observed to be narrower than that of lower temperatures with the achievement of higher degrees of polymerization. For example, at a degree of polymerization (DP) of 23, the polymer ECP-Magenta achieved a dispersity of 1.64 with an isolated yield of 87%, whereas the normal Flory-Schultz distribution for that dispersity is 1.96, and a structurally similar poly(3,3-Bis(hexyloxymethyl)-3,4-dihydro-2H-thieno[3,4-b][1,4]-dioxepine prepared at 100° C. achieved a DP of 25 with a $Đ_M$ of 1.80, as reported in Zhao et al., *Macromolecules* 2012, 45, 7783-90.

In an embodiment of the invention, no additive, for example a phosphine ligand or a phase transfer reagent is included in the polymerization mixture. The use of a ligand or phase transfer reagent, particularly phosphine comprising ligands, has been shown to produce low $Đ_M$ with moderate DP at temperatures of 100° C. for 3,4-dioxythiophenes with solubilizing substituents; however, this occurs with the increase in impurities in the final polymer.

Homopolymerizations of ECP-Magenta, as shown in FIG. 1, were employed for exemplary polymerizations by the cross-condensation of 3,3-bis((2-ethylhexyloxy)methyl)-3,4-dihydro-2H-thieno[3,4-b][1,4]dioxepine (1) and 6,8-dibromo-3,3-bis((2-ethylhexyloxy)methyl)-3,4-dihydro-2H-thieno[3,4-b][1,4]dioxepine (2) or the self-condensation of 6-bromo-3,3-bis((2-ethylhexyloxy)methyl)-3,4-dihydro-2H-thieno[3,4-b][1,4]dioxepine (3), according to an embodiment of the invention, to compare with oxidative polymerization (OxP) and Grignard metathesis (GRIM), polymerization. OxP yields ECP-Magenta with the number average molecular weight ($M_n$) of 30 kDa, where large amounts of $FeCl_3$ (≥4 equivalents) are necessary to achieve high $M_n$. The purification of the OxP produced ECP-Magenta was complicated by the large amount of residual Fe/Fe(II)/Fe(III) in the composition. Grignard metathesis (GRIM) polymerization provides high $M_n$ ($M_n$=10-48 kDa), where the removal of impurities requires multiple days of Soxhlet extraction. The synthesis and purification of ECP-Magenta by DHAP, according to an embodiment of an invention, is easily completed in less than one day. Temperature has a significant influence on the product in addition to the rate of polymerization. Polymerization is slow at 80-100° C., and is rapid at 140° C., according to an embodiment of the invention.

Figure 2:
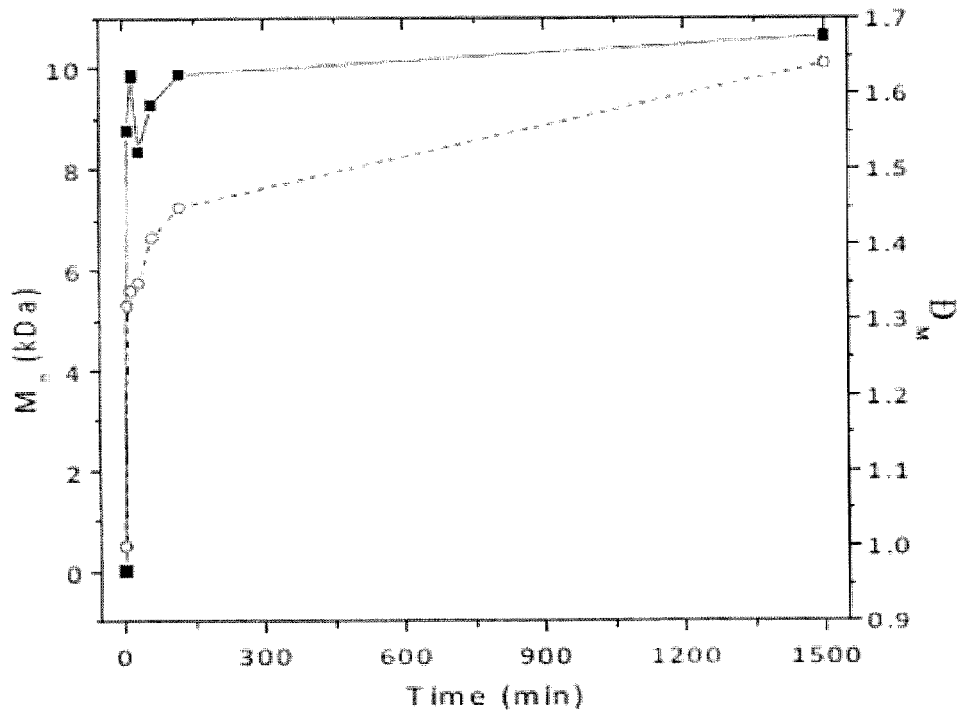
FIG. 2 shows a plot of polymer molecular weight ($M_n$) growth ■ and dispersity ($Ð_M$) growth ○ vs. polymerization time for ECP-Magenta, according to an embodiment of the invention.
Figure 3:
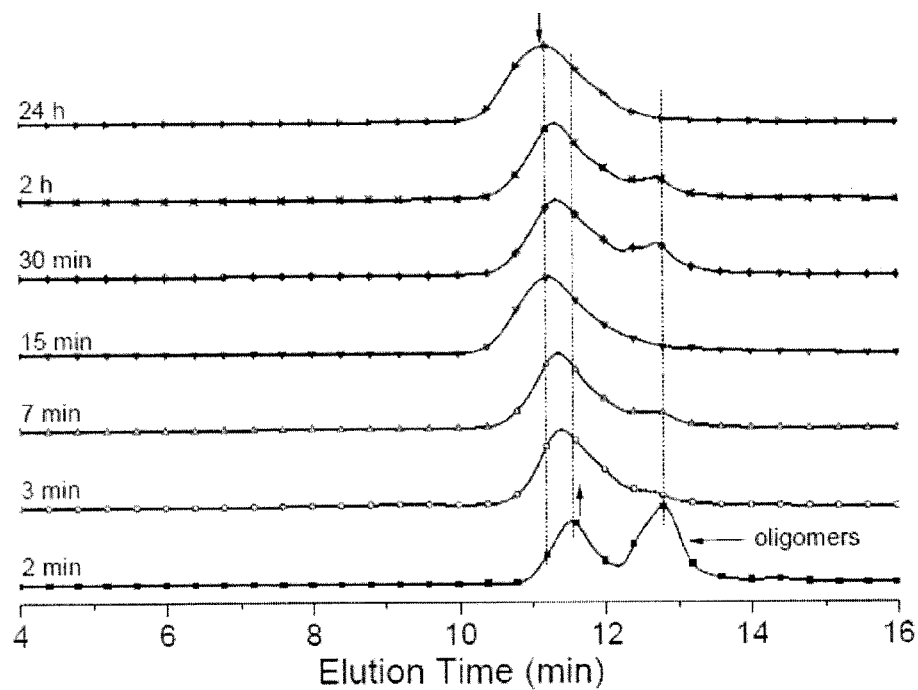
FIG. 3 shows gel permeation chromatography (GPC) traces vs. polymerization time for ECP-Magenta, according to an embodiment of the invention.
Figure 4:
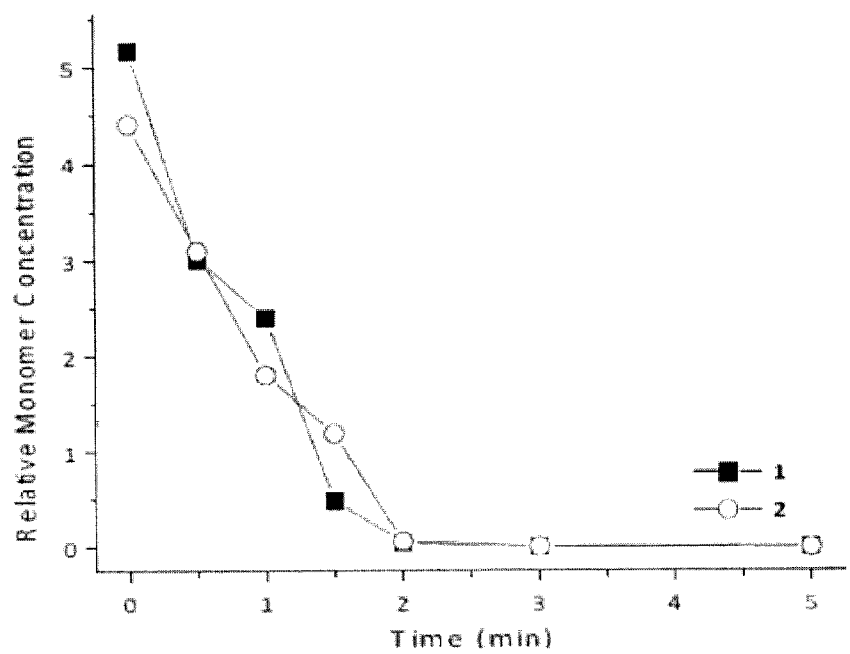
FIG. 4 shows a plot of monomer concentrations vs. time for polymerization of complementary monomers to ECP-Magenta, as shown in FIG. 1a), according to an embodiment of the invention.

To evaluate the evolution of molecular weight, $M_n$, and monomer consumption during DHAP, small aliquots (1-2 mL) of the reaction mixture were removed and precipitated in a 1:1 conc. HCl:MeOH mixture, extracted with DCM, and concentrated. The resulting polymers were analyzed by GPC and $^1$HNMR. The plot of $M_n$ and $Ð_M$, versus polymerization time is shown in FIG. 2. The data indicates that the polymer grows rapidly, and then remains at a nearly constant DP with a relatively narrow dispersity. GPC traces, as shown in FIG. 3, display rapid oligomer formation with nearly complete monomer consumption, as indicated in FIG. 4, followed by slower oligomer coupling over about 24 hours. Good isolated yields (80-90%) of the polymer aliquots were achieved after precipitating the polymers in 1:1 MeOH/1 N aqueous HCl solution with vigorous stirring followed by filtration and washing with copious amounts of water (until AgCl test is negative) and a final washing with MeOH. An $M_n$≥10 kDa against polystyrene standards with a narrow dispersity ($Ð_M$~1.6) was achieved within 3 to 15 hours, where after 3 hours, an $M_n$ of 10.0 kDa, with a $Ð_M$ of 1.59 progressed to an $M_n$ of 10.6 kDa and a $Ð_M$ of 1.64 after 15 hours. Other polar aprotic solvents such as NMP and HMPA also provide narrow molecular weight distributions but provided higher DPs, as shown in Table 1, below.

TABLE 1

Preparation of ECP-Magenta via DHAP in various solvents.

| Solvent | ε | Time (h) | Yield (%) | $M_n$ (kDa) | $Ð_M$ |
|---|---|---|---|---|---|
| DMAc | 38 | 15 | 87 | 10.6 | 1.64 |
| NMP | 32 | 24 | 82 | 23.0 | 1.74 |
| HMPA | 31 | 24 | 80 | 26.3 | 2.52 |

ε = Dielectric constant

Figure 5:
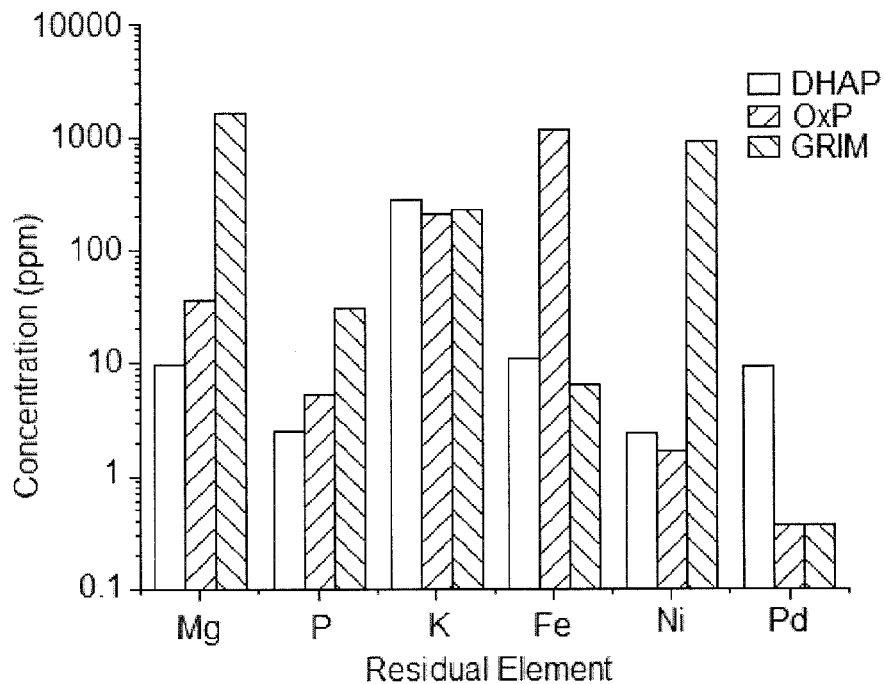
FIG. 5 shows a bar graph for selected impurities after purification by the DHAP method, according to an embodiment of the invention, and comparative OxP, and GRIM methods.
Figure 6:
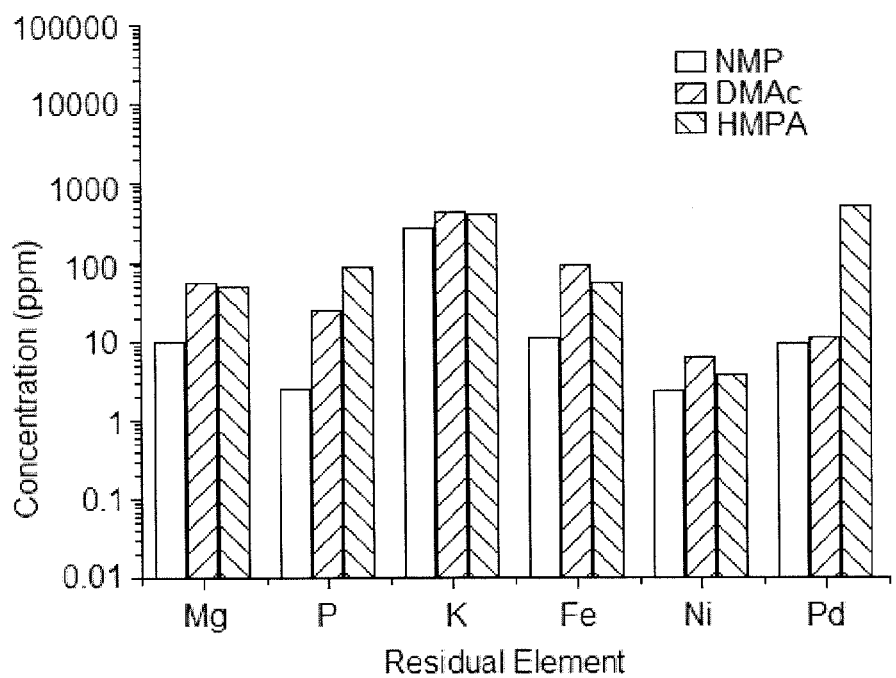
FIG. 6 shows a bar graph for selected impurities after purification by the DHAP method using various solvents, according to an embodiment of the invention.

Additional purifications of ECP-Magentas prepared by DHAP, OxP, and GRIM, were carried out by dissolving the precipitated polymers in chlorobenzene at 50° C., treating with a Pd-scavenger, diethylammonium diethyldithiocarbamate, and 18-crown-6 to remove residual potassium salts, followed by precipitating in MeOH, filtering, washings with MeOH and hexanes, and drying under vacuum overnight. The rigorous purification provides little differences in $M_n$ values or $^1$H NMR spectra from the polymers prior to precipitation; however, the ability to achieve a polymer with few metal ion impurities was superior for DHAP under this precipitation procedure, as indicated if FIG. 5. Similar analysis was carried out for ECP-Magentas prepared by DHAP prepared in DMAc, NMP and HMPA, where, as shown in FIG. 6, the residual Pd and P was significantly higher in HMPA, as indicated in Table 2, below.

TABLE 2

Elemental concentrations (ppm) for ECP-Magenta samples prepared in various solvents

| | NMP | | DMAc | | HMPA | |
|---|---|---|---|---|---|---|
| Element | BP | AP | BP | AP | BP | AP |
| Li | 3.5 | 1.4 | 7.0 | 1.3 | 5.4 | 0.7 |
| B | 23.6 | 7.8 | 6.7 | 6.8 | 8.1 | 5.4 |
| Na | 82.2 | 17.9 | 98.1 | 37.9 | 844.8 | 566.3 |
| Mg | 7.49 | 9.75 | bdl | 56.08 | 9.83 | 48.93 |
| Al | bdl | 5.57 | 2.65 | 141.13 | bdl | 26.17 |
| Si | 401 | 1826 | 1072 | 15487 | 1446 | 13884 |
| P | 6.2 | 2.5 | 21.4 | 22.8 | 17764 | 88.3 |
| K | 1109 | 277 | 33694 | 442 | 25967 | 406 |
| Ca | 357.2 | 217.9 | 162.6 | 383.1 | 254.1 | 320.6 |
| Ti | 0.25 | 0.96 | bdl | 1.52 | bdl | 2.15 |
| Cr | 45.59 | 40.96 | 25.31 | 59.76 | 15.87 | 26.41 |
| Mn | 1.89 | 1.82 | 1.43 | 3.14 | 1.42 | 2.19 |
| Fe | 0.73 | 10.64 | 35.76 | 91.95 | 44.98 | 50.68 |
| Ni | 1.21 | 2.37 | 6.42 | 6.09 | 6.43 | 4.02 |
| Cu | 3.35 | 1.82 | 7.36 | 3.23 | 6.65 | 2.09 |
| Zn | 36.24 | 14.53 | 42.44 | 10.99 | 1510 | 24.90 |
| Ge | 6.49 | 8.26 | 5.53 | 11.52 | 6.29 | 8.83 |
| Rb | 0.70 | 0.60 | 1.64 | 0.83 | 1.55 | 0.60 |
| Sr | 3.14 | 3.38 | 2.50 | 5.01 | 4.39 | 4.71 |
| Y | 0.43 | 0.47 | 0.30 | 1.12 | 0.36 | 0.76 |
| Pd | 756.0 | 9.3 | 1132.4 | 11.4 | 2924.6 | 528.4 |
| Ag | 5.3 | 4.0 | 2.7 | 4.9 | 3.1 | 4.2 |
| Sn | 4.13 | 2.10 | 1.64 | 3.36 | 2.32 | 2.97 |
| Te | 13.24 | 14.27 | 9.30 | 17.48 | 10.99 | 15.15 |
| Ba | 1.79 | 3.44 | 1.67 | 6.07 | 9.08 | 10.20 | bdl: below detection limit.

Figure 7:
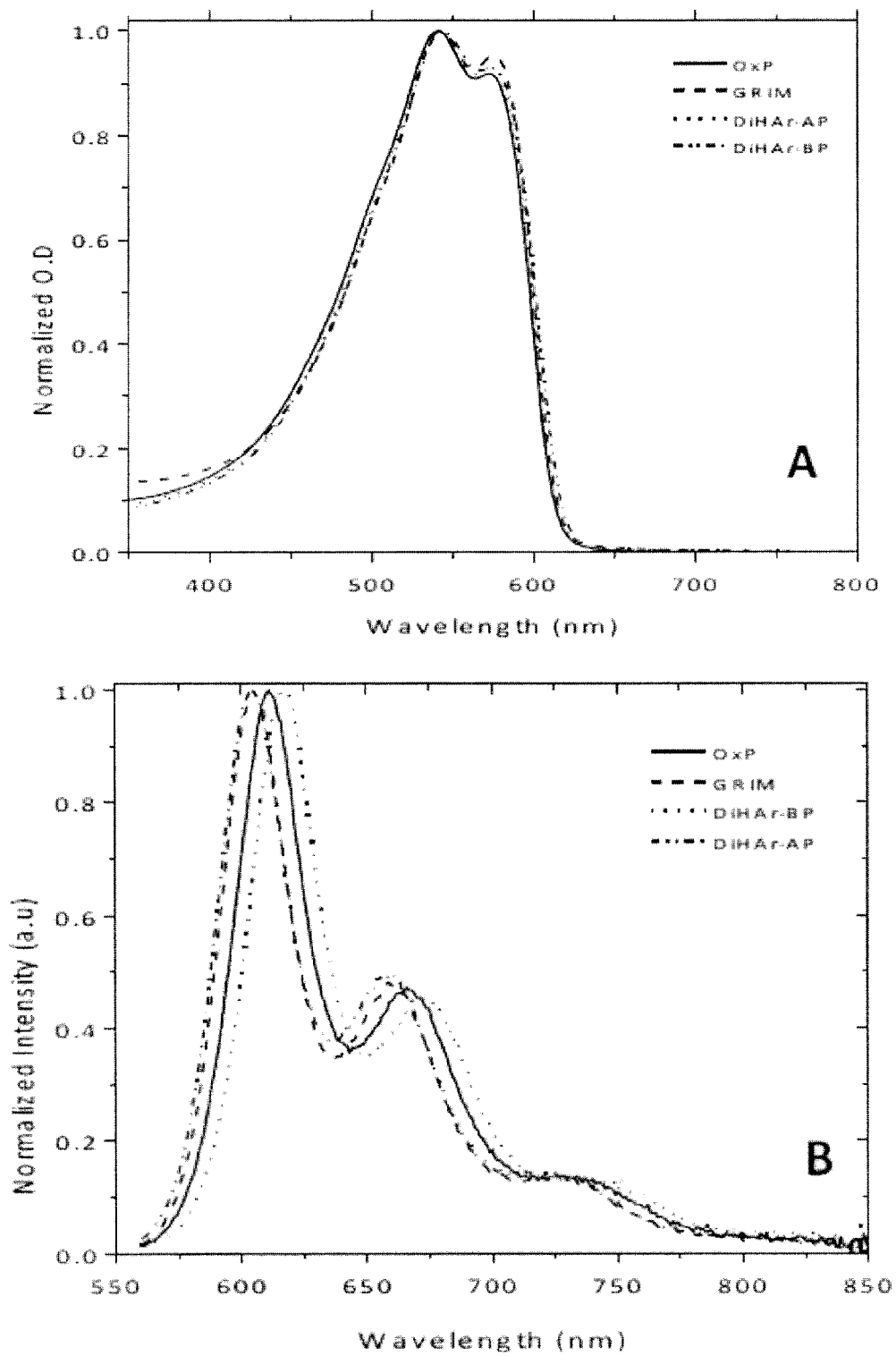
FIG. 7A shows absorption and FIG. 7B shows emission spectra for ECP-Magenta prepared by comparative OxP and GRIM methods and the DHAP method before and after purification, according to an embodiment of the invention.
Figure 8:
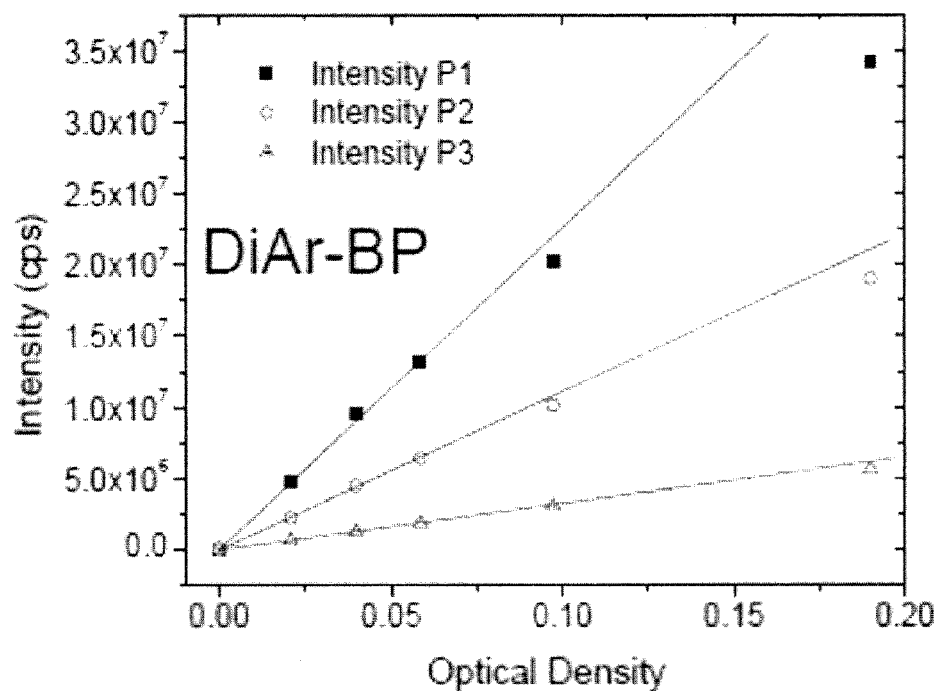
FIG. 8 shows plots of optical densities vs. fluorescence intensities for ECP-Magenta prepared, according to an embodiment of the invention, before (BP) and after (AP) purification at probe wavelengths: 605-610 (P1), 660-666 (P2), and 725-734 (P3) nm.
Figure 8:
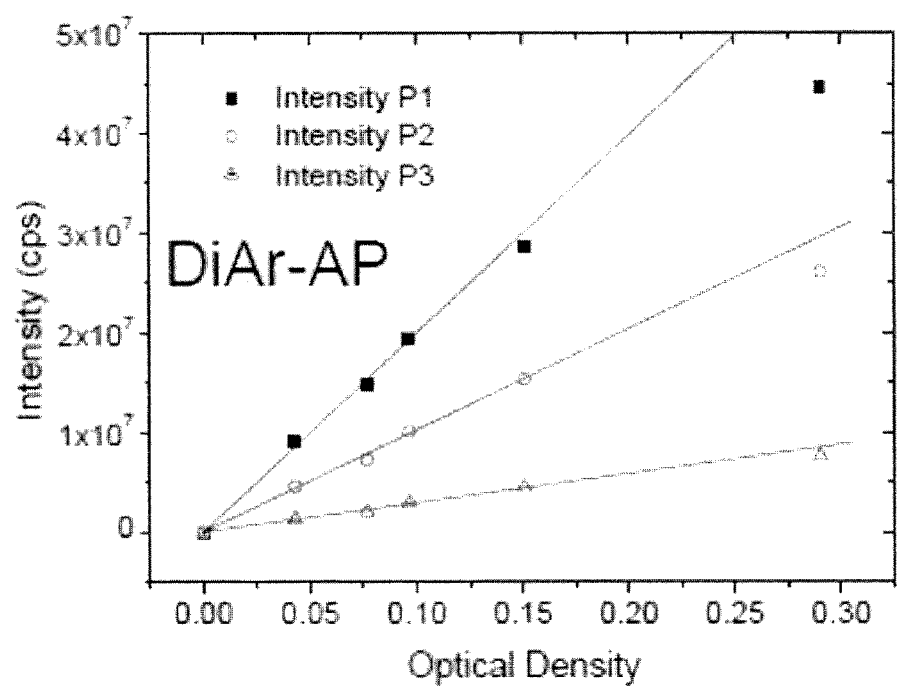

FIG. 7 shows UV-Vis absorption and emission spectra of toluene solutions of ECP-Magentas synthesized by different methods. Absorption spectra are nearly identical, except for the low energy maximum localized at 595. However, the solution fluorescence differs more noticeably; the OxP and DHAP polymer before purification presented the reddest shifted spectra relative to the GRIM and DHAP after purification polymers. The lower fluorescence yield of the DHAP sample before purification appears to indicate non-radiative decay paths due to residual Pd content, as shown in FIG. 8.

Table 3, below, gives the results of DHAP polymerizations, according to embodiments of the invention, where various electrochromic polymers that are alternating copolymers or quasi-random copolymers, with isolated non-dioxyhetereocycle repeating units, were performed using a common dioxythiophene donor in NMP, as indicated in FIGS. 9 through 12. All DHAP polymerizations afforded high molecular weight in good yields, where only ECP-Blue did not meet or exceed DPs achieved by other polymerization methods. Although EPC-Cyan was not characterized by GPC due to its insolubility in THF, its insolubility in DHAP suggests a higher $M_n$ than that prepared by OxP, which does permit GPC characterization in THF.

TABLE 3

Synthesis of ECPs by DHAP in NMP

| Polymer | Yield (%) | $M_n$ (kDa) | Đ M | DP |
|---|---|---|---|---|
| ECP-Magenta | 82 | 23.0 | 1.74 | 52 |
| ECP-Yellow | 76 | 27.5 | 1.19 | 53 |
| ECP-Blue | 81 | 9.41 | 1.54 | 16 |
| ECP-Cyan | 89 | — | — | — |
| ECP-Black | 76 | 11.0 | 2.03 | — |

Toluene solutions of the ECPs were sprayed onto ITO slides, which were characterized by UV-Vis spectrophotometry. The ECP-Magenta film exhibits good color purity and excellent contrast (Δ% T=79% at 530 nm) which was similar to the best performing ECP-Magenta prepared by other methods (Δ% T=80% at 609 nm). Upon comparison of spectroelectrochemical curves of the DHAP prepared EPC polymers with that reported in the literature, no significant differences in performance is discernible, except for ECP-Blue, which displays a smaller contrast than that prepared with a higher $M_n$. This implies that the contrast is a function that depends on the polymer's $M_n$ whether or not the polymer contains residual impurities. Nevertheless, because of its mass efficiency, shorter production times, and simpler purification procedures, the DHAP method according to an embodiment of the invention, is a cost effective method for the synthesis of the full color palette of ECPs. The resulting polymers are often of narrow dispersity and can be of relatively high Degree of Polymerization (DP) where the DP is at least 10 and typically in excess of 15.

METHODS AND MATERIALS

Commercially available reagents were used as received from the chemical suppliers. Reactions that required anhydrous conditions were carried out under an inert atmosphere of argon in flame-dried glassware. Toluene and THF were dried using a solvent purification system (MBraun MB Auto-SPS). The rest of solvents used for synthetic purposes were purified using conventional protocols, except glacial acetic acid which was used as received. All reactions were monitored using F250 silica gel 60 M analytical TLC plates, with UV detection (λ=254 and 365 nm). Silica gel (60 Å, 40-63 μm) was used as stationary phase for column chromatography. NMR experiments were acquired with working frequencies of 300 MHz for $^1$H, and 75.5 MHz for $^{13}$C experiments. The shifts were reported in parts per million (ppm) and referenced to the residual resonance signals of commercially available deuterated chloroform: δH=7.26 ppm, δC=77.0 ppm. High-resolution mass spectra were recorded on a quadrupole mass analyzer instrument equipped with a direct insertion probe (ionization 70 eV) and an electron spray ionizer. Gel permeation chromatography (GPC) was performed using a Waters Associates GPCV2000 liquid chromatography with is internal differential refractive index detector at 40° C., using two Waters Styragel HR-5E column (10 mm PD, 7.8 mm i.d., 300 mm length) with HPLC grade THF as the mobile phase at flow rate of 1.0 mL/min. The polymer was dissolved initially in THF (2 mg/mL), and allowed to solubilize for 24-48 hour period, in which the solution was filtered through a Millipore 0.5 μm filter. Injections of ~200 μL were performed and retention times were calibrated against narrow molecular weight polystyrene standards.

All reagents used for ICP-MS elemental analyses were Optima-grade and the sample preparation was done under a clean lab environment in the Department of Geological Sciences at the University of Florida. Polymer samples were digested in pre-cleaned Savillex PFA vials with aqua regia (3 mL HCl and 1 mL $HNO_3$) overnight on a hot plate at 120° C. During the aqua regia digestion the polymer samples turn into a yellowish transparent mass. Although no complete dissolution of the polymer is achieved, it is expected that the elements of interest will be transferred quantitatively in solution. After digestion, part of the aqua regia solution is further diluted with 5% $HNO_3$ and loaded in the ICP-MS for analysis. Elemental analyses were performed on a ThermoFinnigan Element2 HR-ICP-MS in medium resolution mode. Quantification of results was performed with external calibration using a combination of commercially available standards gravimetrically diluted to appropriate concentrations. All concentrations are reported in ppm in the polymer. Electrochemistry was carried out in 0.1 M $TBAPF_6$/propylene carbonate solutions, using a standard 3-electrode system: the reference electrode was Ag|Ag+ (10 mM $AgNO_3$/ 0.5 M $TBAPF_6$/ACN solution) calibrated against the Fc|Fc+ ($V_{Fc/Fc+}$=81 mV), the counter electrode was a Pt-wire, and the working electrode was an ITO-coated glass slide (7×50× 0.7 mm3, 20 Ω/sq) from Delta Technologies Ltd. Propylene carbonate was dried using a Vacuum Atmospheres SPS. All electrochemical measurements were carried out using an EG&G PAR galvanostat/potentiostat PC-controlled using Scribner Associates 169 CorrWare II software. Absorption spectra were recorded in a double-beam Varian Cary 5000 UV-Vis-NIR spectrophotometer; the baseline correction included solution, ITO-slide, and glass cuvette. Fluorescence spectra were recorded in a Fluorolog-1057 from Horiba-Jovin-Yvon: the samples were excited using a standard 450 W xenon CW lamp and the fluorescence was detected using a multialkali PMT (250-850 nm). Correction factors for lamp signal and detector dark counts were applied using the FluorEssence® software from HJY.

6,8-dibromo-3,3-bis((2-ethylhexyloxy)methyl)-3,4-dihydro-2H-thieno[3,4-b][1,4]dioxepine (2) and 6-bromo-3,3-bis((2-ethylhexyloxy)methyl)-3,4-dihydro-2H-thieno[3,4-b][1,4]dioxepine (3): 3,3-bis((2-ethylhexyloxy)methyl)-3,4-dihydro-2H-thieno[3,4-b][1,4]dioxepine (1, 12.1 g, 27.5 mmol) was dissolved in chloroform (50 mL) and covered from light using aluminum foil. After cooling the mixture in an ice/water bath, N-bromosuccinimide (5.4 g, 30.2 mmol) was added in small portions. The bath was removed, and the mixture was kept for 8 hours at room temperature. Water (25 mL) was added and the heterogeneous mixture was transferred to a separation funnel. After shaking, the layers separated and the aqueous layer was further extracted with DCM (3×50 mL). The organic mixtures were combined, dried over MgSO4, filtered, and evaporated to dryness. The residual light yellow oil was purified via column chromatography in hexanes. (2): Light yellow oil. 6.4 g, 39% yield. (MS, $^1$H NMR) $^1$H NMR (300 MHz, CDCl3, δ): 4.09 (s, 4H), 3.47 (s, 4H), 3.24 (d, 4H), 1.2-1.6 (m, 18H), 0.8-1.0 (m, 12H). LRMS: [M•+] 598.51, expected for C25H42O4SBr2: 598.47. (3): Light yellow oil. 4.7 g, 33% yield. 1H NMR (300 MHz, CDCl3, δ): 6.44 (s, 1H), 3.98-4.10 (d, J=2.4 Hz, 4H), 3.47 (s, 4H), 3.24-3.30 (d, J=0.6 Hz, 4H), 1.15-1.55 (m, 18H), 0.80-0.95 (m, 12H). HRMS: [M•+] 518.2052, expected for C25H43O4SBr: 518.2065.

3,3,3',3'-tetrakis(((2-ethylhexyl)oxy)methyl)-3,3',4,4'-tetrahydro-2H,2'H-6,6'-bithieno[3,4-b][1,4]dioxepine (6): Compound 1 (2.0 g, 4.5 mmol) was dissolved in anhydrous THF (25 mL) under argon. The mixture was cooled in a dry ice/acetone bath followed by dropwise addition of n-BuLi (2.89 M in hexanes, 1.6 mL, 0.5 mmol). The yellow mixture was warmed in an ice/water bath and slowly transferred to a suspension of Fe(acac)$_3$ in THF at room temperature via a cannula. The mixture was heated to gentle reflux and stirred overnight. The resulting suspension was filtered through silica gel and eluted with hexanes until no product was observed in the filtrate by TLC. The resulting organic solution was evaporated to dryness and purified via flash chromatography using hexanes as eluent. Colorless oil was obtained (1.35 g, 68% yield). $^1$H NMR (300 MHz, CDCl3, δ): 6.36 (s, 2H), 4.00-4.12 (d, J=2.4 Hz, 8H), 3.50 (s, 8H), 3.25-3.31 (d, J=0.6 Hz), 1.42-1.54 (m, 4H), 1.20-1.42 (m, 36H), 0.80-1.00 (m, 24H). HRMS: [M•+] 878.5743, expected for $C_{50}H_{86}O_8S_2$: 878.5764.

ECP-Magenta (A), as schematically illustrated in FIG. 1a): To an oven dried Schlenk tube fitted with a magnetic stir bar Pd(OAc)$_2$ (2.25 mg, 2 mol %), K$_2$CO$_3$ (173 mg, 1.3 mmol), and Pivalic Acid (0.01 g, 0.15 mmol) were added sequentially. The reaction flask was evacuated for a total of ten minutes, and purged with anhydrous argon. The evacuation/gas filling sequence was repeated three times. A vial was loaded with 6,8-dibromo-3,3-bis((2-ethylhexyloxy)methyl)-3,4-dihydro-2H-thieno[3,4-b][1,4]dioxepine (2, 299 mg, 0.5 mmol), and 3,3-bis((2-ethylhexyloxy)methyl)-3,4-dihydro-2H-thieno[3,4-b][1,4]dioxepine (1, 220 mg, 0.5 mmol). After evacuating for 10 minutes, argon saturated solvent (2 mL), either DMAc, NMP, or HMPA, was added via argon flushed syringe. The resulting solution was transferred to a Schlenk tube via a syringe. The vial was washed twice with 2 mL of Ar-saturated solvent, with each washing being transferred to the reaction flask. The combined reagents were put into a 140° C. oil bath and allowed to stir for three hours. Upon cooling to room temperature, the mixture was poured into 50 mL of a 1:1 MeOH/1M HCl aqueous solution with vigorous stirring. The resulting precipitate was filtered, washed with water (5×10 mL), then MeOH (3×10 mL), and dried for 15 minutes by an air stream through the filter cake. The resulting solid was suspended in 50 mL of chlorobenzene and heated to 60° C. Once the solids dissolved completely, diethyl dithiocarbamic acid diethylammonium salt (Pd-scavenger, 2.0 mg, ~4 eq of Pd content) and 18-crown-6 (1.3 g, 5 mmol) were added. The solution was stirred for four hours. The reaction mixture was cooled to room temperature and precipitated into MeOH. The precipitate was filtered by gravity filtration, washed with MeOH (5×10 mL), and hexanes (3×5 mL) and dried under vacuum overnight. A total of 388 mg of dark maroon powder was obtained (88% yield). $^1$H NMR (300 MHz, CDCl$_3$, δ): 4.15 (bs, 4H), 3.60 (bs, 4H), 3.33 (bs, 4H), 1.52 (bs, 4H), 1.20-1.45 (m, 18H), 0.82-0.94 (m, 12H). GPC (THF, PS): M$_n$=9,980 g/mol, Đ$_M$=1.42.

ECP-Magenta (B), as schematically illustrated in FIG. 1b): This material was prepared following the procedure described for ECP-Magenta with the following modifications: all solid materials were loaded into, the over dried Schlenk. In a separate vial, 6-bromo-3,3-bis((2-ethylhexyloxy)methyl)-3,4-dihydro-2H-thieno[3,4-b][1,4]dioxepine (3, 299 mg, 0.5 mmol) was weighed. The sequences of evacuation/purging, plus reactant mixing was carried out as the general procedure for ECP-Magenta. Once all reactants were mixed altogether, the tube was inserted into the oil bath preheated at 140° C. After 3 hours, the resulting yellow mixture was worked up and the resulting polymer was isolated as previously described for ECP-Magenta. A total of 210 mg of dark purple-colored powder was obtained (95% yield). All characterization data matched that for ECP-Magenta from 1 and 2. GPC (THF, PS): M$_n$=9,440 g/mol, Đ$_M$=1.42.

Figure 9:
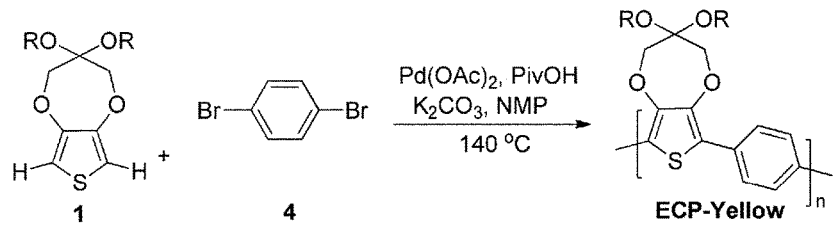
FIG. 9 shows a reaction scheme for the preparation of ECP-Yellow from a pair of complementary monomers, according to an embodiment of the invention.

ECP-Yellow, as schematically illustrated in FIG. 9: This material was prepared following the procedure described for ECP-Magenta using NMP with the following modifications: all solid materials were loaded into the oven dried Schlenk tube including 1,4-dibromobenzene (4, 118 mg, 0.5 mmol). In a separate vial, 3,3-bis((2-ethylhexyloxy)methyl)-3,4-dihydro-2Hthieno[3,4-b][1,4]dioxepine (1, 220 mg, 0.5 mmol) was weighed. The sequences of evacuation/purging, plus reactant mixing is as the general procedure for ECP-Magenta. Once all reactants were mixed, the tube was inserted into the oil bath preheated at 140° C. After 3 hours, the resulting yellow mixture was worked up and the resulting polymer was isolated, as described, above, for ECP-Magenta. A total of 210 mg of dark orange-colored powder was obtained (76% yield). $^1$H NMR (300 MHz, CDCl$_3$, δ): 7.75 (bs, 4H), 4.19 (bs, 4H), 3.60 (bs, 4H), 1.52 (bs, 4H), 1.22-1.44 (m, 18H), 0.82-0.98 (m, 12H). GPC (THF, PS): M$_n$=27,500 g/mol, Đ$_M$=1.19.

Figure 10:
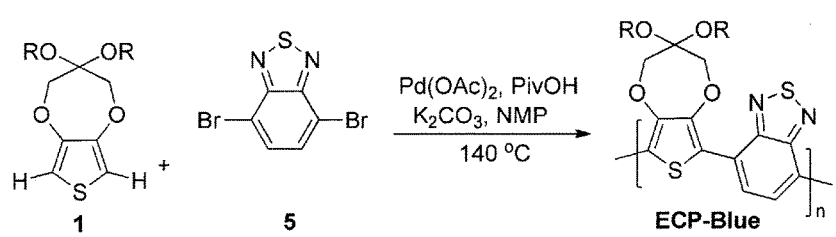
FIG. 10 shows a reaction scheme for the preparation of ECP-Blue from a pair of complementary monomers, according to an embodiment of the invention.

ECP-Blue, as schematically illustrated in FIG. 10: This material was prepared following exactly the procedure described for ECP-Magenta using NMP with the following modifications: all solid materials were loaded into the oven dried Schlenk tube including 4,7-dibromo-2,1,3-benzothiadiazole (5, 147 mg, 0.5 mmol). In a separate vial, 3,3-bis((2-ethylhexyloxy)methyl)-3,4-dihydro-2H-thieno[3,4-b][1,4]dioxepine (1, 220 mg, 0.5 mmol) was weighed. The sequences of evacuation/purging, plus reactant mixing is as the general procedure. Once all reactants were mixed, the tube was inserted into the oil bath preheated at 140° C. After 3 hours, the resulting dark blue mixture was worked up and the resulting polymer was isolated as described, above, for ECP-Magenta. A total of 375 mg of dark blue-colored (almost black) powder was obtained (81% yield). $^1$H NMR (300 MHz, CDCl$_3$, δ): 8.42 (bs, 2H), 4.33 (bs, 4H), 3.65 (bs, 4H), 3.35 (bs, 4H), 1.20-1.60 (m, 22H), 0.85-0.98 (m, 12H). GPC (THF, PS): M$_n$=9,440 g/mol, Đ$_M$=1.54.

Figure 11:
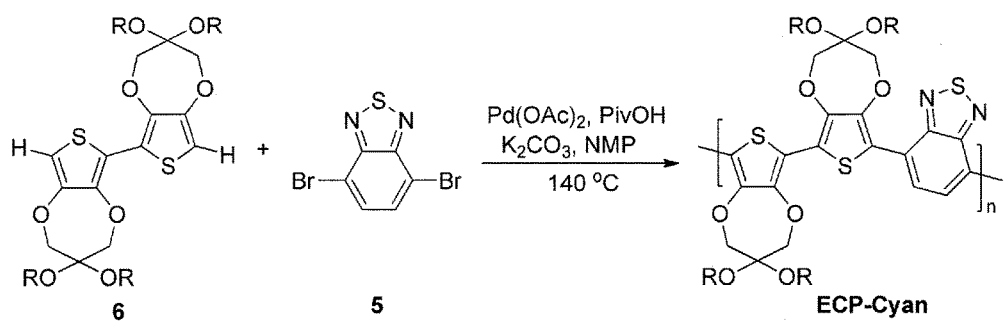
FIG. 11 shows a reaction scheme for the preparation of ECP-Cyan from a pair of complementary monomers, according to an embodiment of the invention.

ECP-Cyan, as schematically illustrated in FIG. 11: This material was prepared following exactly the procedure described for ECP-Magenta using NMP with the following modifications: all solid materials were loaded into the oven dried Schlenk tube including 4,7-dibromo-2,1,3-benzothiadiazole (5, 147 mg, 0.5 mmol). In a separate vial, 3,3,3',3'-tetrakis(2-ethylhexyloxymethyl)-3,3',4,4'-tetrahydro-2H,2'H-6,6'-bithieno[3,4-b][1,4]dioxepine (6, 440 mg, 0.5 mmol) was weighed. The sequence of evacuation/purging, plus reactant mixing is as the general procedure for ECP-Magenta. Once all reactants were mixed, the tube was inserted into the oil bath preheated to 140° C. After 3 hours, the resulting dark cyan mixture was worked up and the resulting polymer was isolated as described, above, for ECP-Magenta. A total of 410 mg of dark blue-colored powder was obtained (89% yield). $^1$H NMR (300 MHz, CDCl$_3$, δ): 8.38 (bs, 2H), 4.26 (bs, 8H), 3.62 (bs, 8H), 3.36 (bs, 8H), 1.16-1.60 (m, 44H), 0.90-0.99 (m, 24H). The sample was sparingly soluble in THF, which precluded its characterization via GPC.

Figure 12:
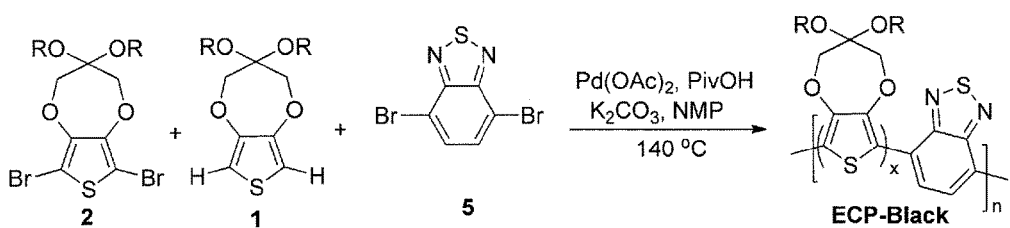
FIG. 12 shows a reaction scheme for the preparation of ECP-Black from a pair of complementary dioxythiophene monomers and 4,7-dibromo-2,1,3-benzothiadiazole 5, according to an embodiment of the invention.

ECP-Black, as schematically illustrated in FIG. 12: This material was prepared following the procedure described for ECP-Magenta using NMP with the following modifications: all solid materials were loaded into the oven dried Schlenk tube including 4,7-dibromo-2,1,3-benzothiadiazole (5, 74 mg, 0.25 mmol). In a separate vial, 6,8-dibromo-3,3-bis((2-ethylhexyloxy)methyl)-3,4-dihydro-2H-thieno[3,4-b][1,4]dioxepine (2, 150 mg, 0.25 mmol), and 3,3-bis((2-ethylhexyloxy)methyl)-3,4-dihydro-2H-thieno[3,4-b][1,4]dioxepine (1, 220 mg, 0.50 mmol) were combined. The sequence of evacuation/purging, plus reactant mixing is as the general procedure for ECP-Magenta. Once all reactants were mixed, the tube was inserted into the oil bath preheated at 140° C. After 3 hours, the resulting black mixture was worked up and the resulting polymer was isolated as described, above, for ECP-Magenta. A total of 395 mg of black-colored powder was obtained (78% yield). $^1$H NMR (300 MHz, CDCl$_3$, δ): 8.38 (bs, 2H), 4.20 (bs, 8H), 3.62 (bs, 8H), 3.36 (bs, 8H), 1.16-1.60 (m, 44H), 0.90-0.99 (m, 24H). GPC (THF, PS): $M_n$=11,000 $D_M$=2.03.

It should be understood that the examples and embodiments described herein are for illustrative purposes only and that various modifications or changes in light thereof will be suggested to persons skilled in the art and are to be included within the spirit and purview of this application.

We claim:

1. A method for preparing a conjugated polymer, comprising
   providing at least one first monomer comprising a 3,4-dioxythiophene, 3,4-dioxyselenophene, 3,4-dioxytellurophene 3,4-dioxyfuran, or 3,4-dioxypyrrole;
   optionally providing at least one second monomer comprising a conjugated unit;
   providing a Pd or Ni comprising catalyst;
   providing an aprotic solvent;
   providing a carboxylic acid;
   combining the first monomer, second monomer, catalyst, solvent and carboxylic acid as a polymerization mixture; and
   heating the polymerization mixture in excess of 120° C. but below the boiling point of the aprotic solvent, wherein at least one of the first monomers or second monomers is substituted with hydrogen reactive functionalities and at least one of the first or second monomers is substituted with non-hydrogen reactive functionalities, wherein the non-hydrogen reactive functionalities are Cl, Br, I, OTs, OTf, CN, OCN, SCN, wherein the polymerization mixture is free of a phosphine ligand, and wherein the ratio of the hydrogen reactive functionalities and the non-hydrogen reactive functionalities permits a degree of polymerization in excess of four.

2. The method of claim 1, wherein the first monomer comprises the structure:

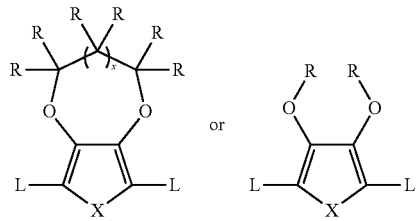

where x is 0 to 3; L is independently H, Cl, Br, I, OTs, OTf, CN, OCN, SCN, or other pseudohalide, X is S, Se, Te, 0, or NR; R is independently H, alkyl, aryl, substituted alkyl, or substituted aryl, oligoether, aminoalkyl, hydroxyalkyl, alkoxyalkyl, acyloxyalkyl, HOS(O)$_2$alkyl, HOC(O)alkyl, (HO)$_2$P(O)alkyl, aminoaryl, hydroxyaryl, alkoxyaryl, acyloxyaryl, HOS(O)$_2$aryl, HOC(O)aryl or (HO)$_2$P(O)aryl, —(CH$_2$)$_m$—YC(O)R$^2$, —(CH$_2$)$_m$—C(O)YR$^2$, —(CH$_2$)$_m$—O—(CH$_2$)$_v$YC(O)R$^2$, —(CH$_2$)$_m$—O—(CH$_2$)$_v$C(O)YR$^2$, —(CH$_2$)$_m$—OCH$_z$(CH$_3$)$_y$[(CH$_2$)$_w$YC(O)R$^2$]$_{3-z}$, —(CH$_2$)$_m$—OCH$_z$(CH$_3$)$_y$[(CH$_2$)$_w$C(O)YR$^2$]$_{3-z}$, or two R groups on adjacent carbons in combination are alkylene, arylene, substituted alkylene, or substituted arylene; m is 1 to 8; y is 0 to 2; z is 0 to 2; y+z is 0 to 2; w is 1 to 8; v is 2 to 8; Y is O, S, or NR$^3$, R$^2$ is a straight chained, branched chain, cyclic or substituted cyclic alkyl group of 1 to 12 carbons; and R$^3$ is a straight chained, branched chain, cyclic or substituted cyclic alkyl group of 1 to 6 carbons.

3. The method of claim 1, wherein the second monomer comprises ethene, carbazole, fluorene, benzothiadiazole, thiadiazoloquinoxaline, quinoline, quinoxaline, thienothiadiazole, thienopyrazine, pyrazinoquinoxaline, benzobisthiadiazole, thiadiazolothienopyrazine, thiophene, pyrrole, furan, selenophene, tellurophene, thieno[3,2-b]thiophene, dithieno[3,2-b:2',3'-d]thiophene, benzo[c][1,2,5]thiadiazole, benzo[c][1,2,5]-oxadiazole, benzo[d][1,2,3]triazole, pyrido[3,4-b]pyrazine, cyanovinylene, thiazolo[5,4-d]thiazole, 1,3,4-oxadiazole, 1,3,4-thiadiazole, 1,3,4-triazole, pyrrolo[3,4-c]pyrrole-1,4-dione, 2,2'-bithiazole, [1,2,5]thiadiazole-[3,4-c]pyridine, thieno[3,4-b]pyrazine, [1,2,5]oxadiazolo[3,4-c]pyridine, dicyanovinylene, benzo[1,2-c;4,5-c']bis[1,2,5]thiadiazole, [1,2,5]thiadiazolo[3,4-g]quinoxaline, cyclopentadi-thiophene-4-one, 4-dicyanomethylenecyclopentadithiolene, benzo[c]thiophene, isoindigo, indigo, 4,4'-bis(alkyl)-[6,6'-bithieno[3,2-b]pyrrolylidene]-5,5'(4H,4'H)-dione, phenanthrene, phenanthrene-9,10-dione, benzo[1,2-b:6,5-b']dithiophene-4,5-dione, napthalenediimide, perylenediimide, any aromatic of the structure:

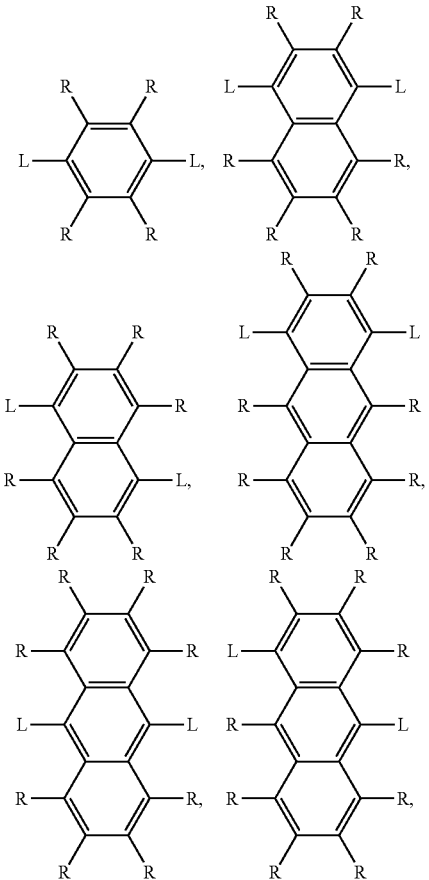

-continued
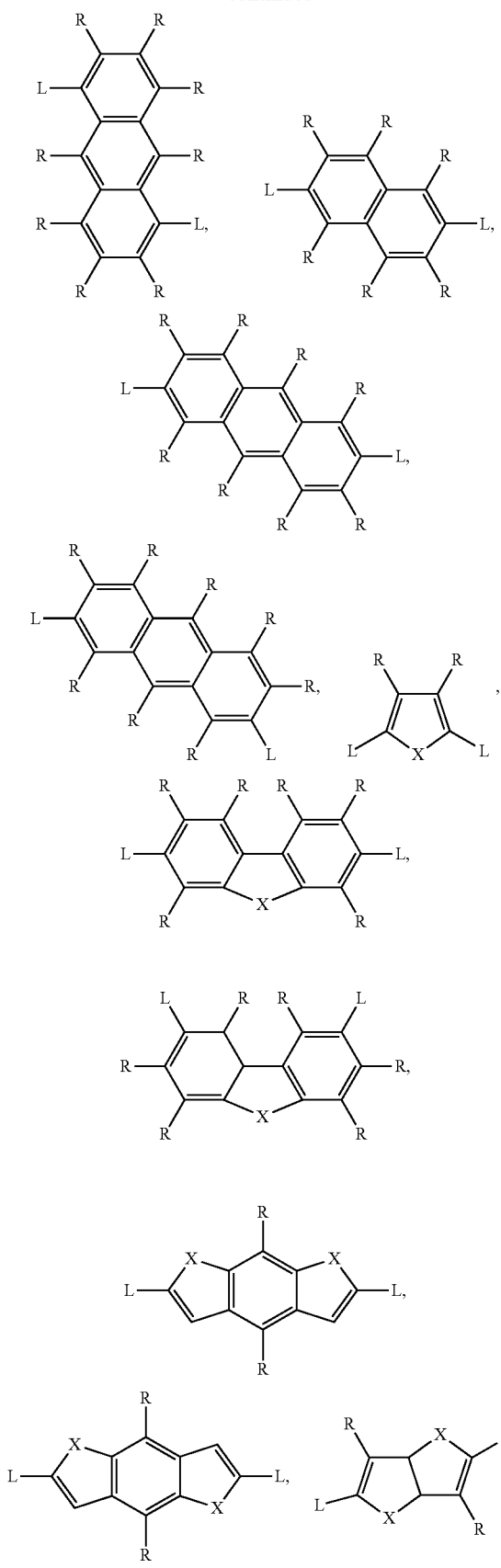
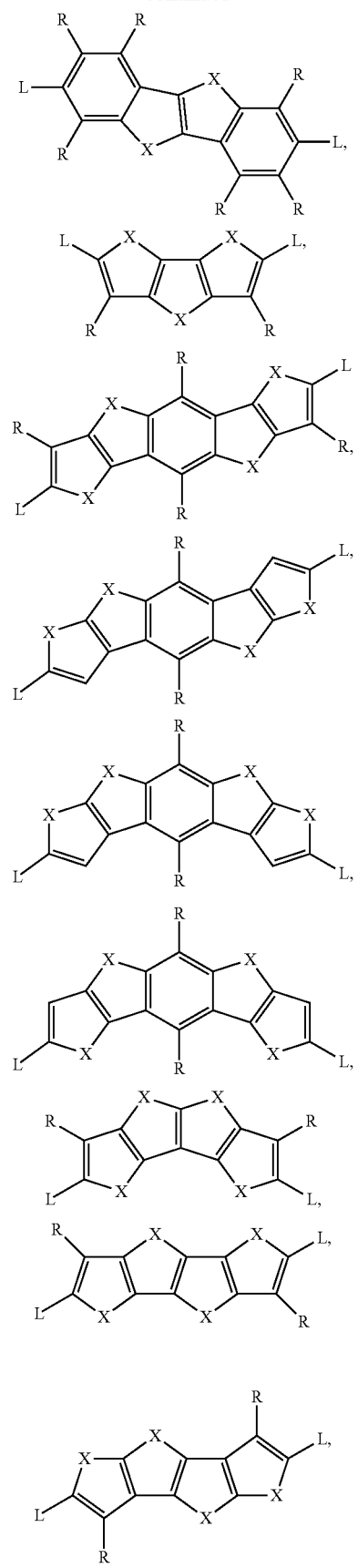

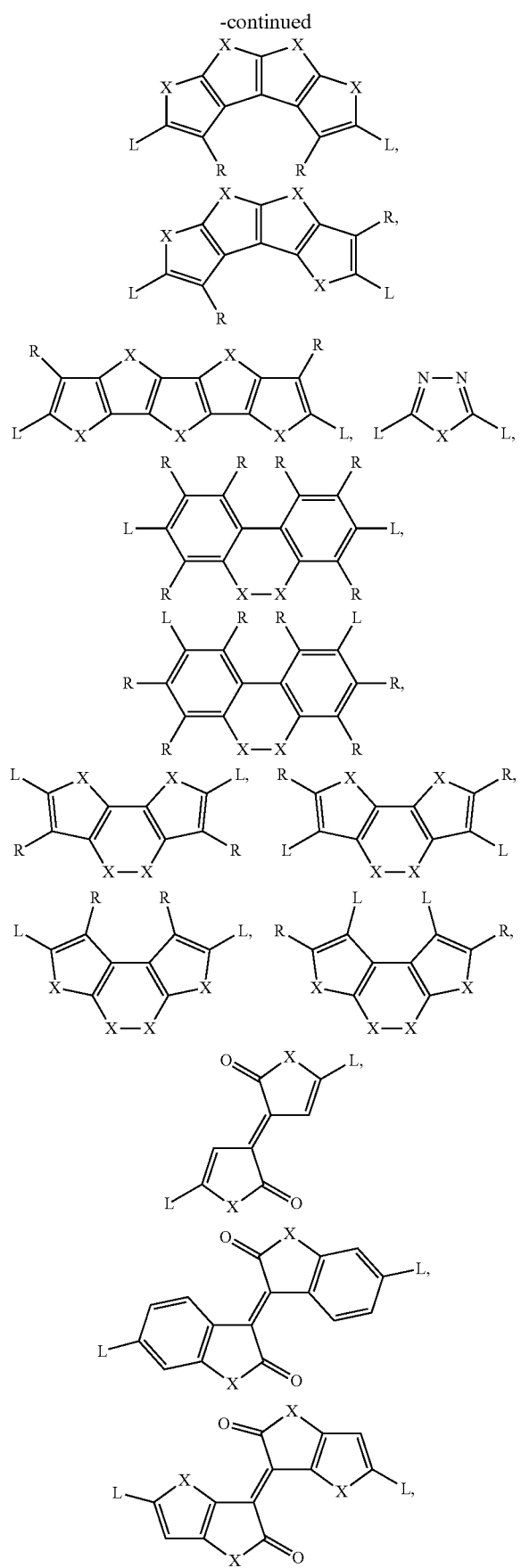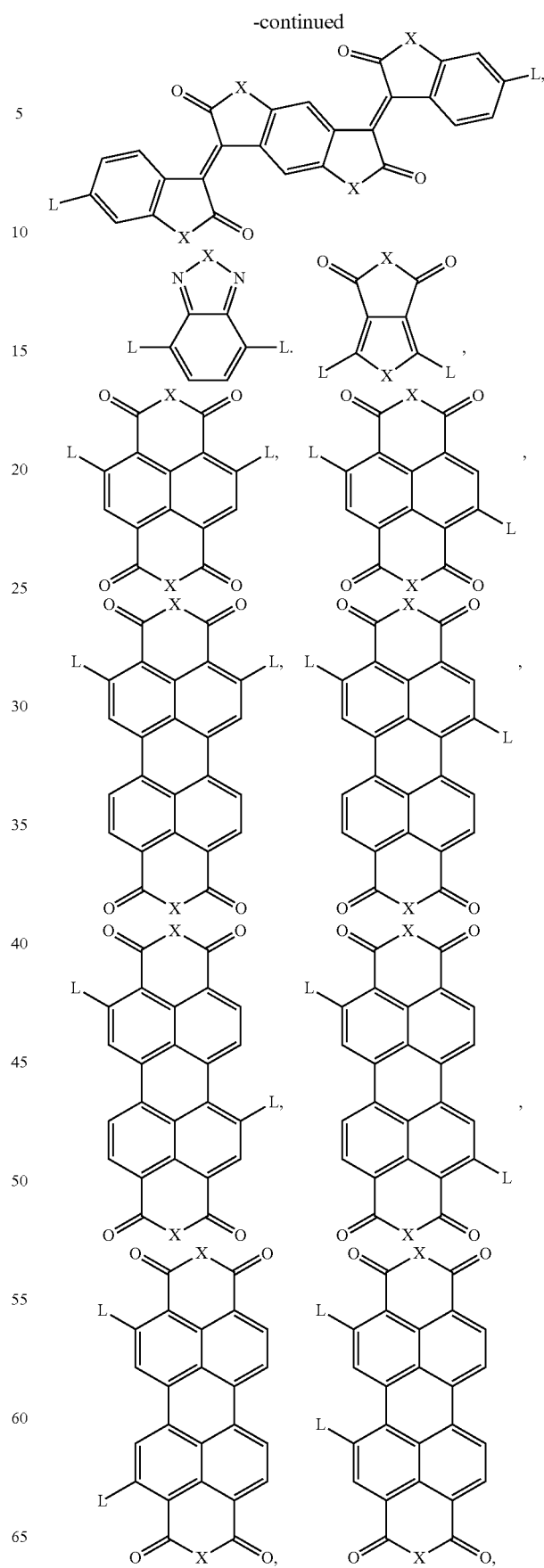

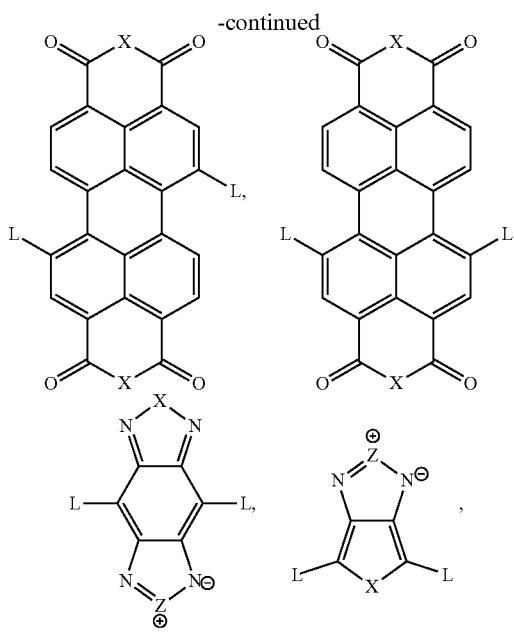

or any oligomers thereof, where: L is independently H, Cl, Br, I, OTs, OTf, CN, OCN, SCN, or other pseudohalide; X is NR', PR', S, O, Se, Te, $CR'_2$, $SiR'_2$, $GeR'_2$, BR', or $SO_X$ where x=1 or 2; Z is NR', PR', S, O, Se, or Te; R' is independently H, $C_1$-$C_{30}$ alkyl, $C_2$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, $C_1$-$C_{30}$ hydroxyalkyl, $C_6$-$C_{14}$ hydroxyaryl, $C_7$-$C_{30}$ hydroxyarylalkyl, $C_3$-$C_{30}$ hydroxyalkenyl, $C_3$-$C_{30}$ hydroxyalkynyl, $C_8$-$C_{30}$ hydroxyarylalkenyl, $C_8$-$C_{30}$ hydroxyarylalkynyl, $C_3$-$C_{30}$ polyether, $C_3$-$C_{30}$ polyetherester, $C_3$-$C_{30}$ polyester, $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$ alkylsulfonate salt, $C_1$-$C_{30}$ alkylcarboxylate salt, $C_1$-$C_{30}$ alkylthiocarboxylate salt, $C_1$-$C_{30}$ alkyldithiocarboxylate salt or $C_3$-$C_{30}$ alkyl $C_1$-$C_4$ trialkyammonium salt; and R is independently H, $C_1$-$C_{30}$ alkyl, $C_2$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, hydroxy, $CO_2H$, $C_2$-$C_{30}$ alkylester, $C_7$-$C_{15}$ arylester, $C_8$-$C_{30}$ alkylarylester, $C_3$-$C_{30}$ alkenylester, $C_3$-$C_{30}$ alkynylester, $NH_2$, $C_1$-$C_{30}$ alkylamino, $C_6$-$C_{14}$ arylamino, $C_7$-$C_{30}$ (arylalkyl)amino, $C_2$-$C_{30}$ alkenylamino, $C_2$-$C_{30}$ alkynylamino, $C_8$-$C_{30}$ (arylalkenyl)amino, $C_8$-$C_{30}$ (arylalkynyl)amino, $C_2$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl)amino, $C_{15}$-$C_{30}$ aryl(arylalkyl)amino, $C_8$-$C_{30}$ alkenyl(aryl)amino, $C_8$-$C_{30}$ alkynyl(aryl)amino C(O)$NH_2$ (amido), $C_2$-$C_{30}$ alkylamido, $C_7$-$C_{14}$ arylamido, $C_8$-$C_{30}$ (arylalkyl)amido, $C_2$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_1$-$C_{30}$ hydroxyalkyl, $C_6$-$C_{14}$ hydroxyaryl, $C_7$-$C_{30}$ hydroxyarylalkyl, $C_3$-$C_{30}$ hydroxyalkenyl, $C_3$-$C_{30}$ hydroxyalkynyl, $C_8$-$C_{30}$ hydroxyarylalkenyl, $C_8$-$C_{30}$ hydroxyarylalkynyl, $C_3$-$C_{30}$ polyether, $C_3$-$C_{30}$ polyetherester, $C_3$-$C_{30}$ polyester, $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$ alkylsulfonate salt, $C_1$-$C_{30}$ carboxylate salt, $C_1$-$C_{30}$ thiocarboxylate salt, $C_1$-$C_{30}$ dithiocarboxylate salt, or $C_3$-$C_{30}$ alkyl$C_1$-$C_4$ trialkyammonium salt.

4. The method of claim 1, wherein the aprotic solvent comprises dimethylformamide (DMF), DMAc, N-methylpyrolidone (NMP), hexamethylphosporamide (HMPA), dimethylsulfoxide (DMSO), or propylene carbonate.

5. The method of claim 1, wherein the catalyst is palladium diacetate, palladium di-trifluoroacetate, or Bis(dibenzylideneacetone)palladium(0).

6. The method of claim 1, wherein the carboxylic acid is pivalic acid or other aliphatic carboxylic acid.

7. The method of claim 1, wherein the temperature is at least 130° C.

8. The method of claim 1, wherein the temperature is at least 140° C.

9. The method of claim 1, wherein the polymerization mixture is free of a phase transfer agent.

10. The method of claim 1, wherein first monomer is 3,3-bis((2-ethylhexyloxy)methyl)-3,4-dihydro-2H-thieno[3,4-b][1,4]dioxepine, 6,8-dibromo-3,3-bis((2-ethylhexyloxy)methyl)-3,4-dihydro-2H-thieno[3,4-b][1,4]dioxepine, and/or 6-bromo-3,3-bis((2-ethylhexyloxy)methyl)-3,4-dihydro-2H-thieno[3,4-b][1,4]dioxepine.

11. The method of claim 10, wherein the second monomer is 1,4-dibromobenzene or 4,7-dibromo-2,1,3-benzothiadiazole.

12. A method for preparing a conjugated polymer, comprising
providing at least one first monomer comprising a 3,4-dioxythiophene, 3,4-dioxyselenophene, 3,4-dioxytellurophene 3,4-dioxyfuran, or 3,4-dioxypyrrole;
optionally providing at least one second monomer comprising a conjugated unit;
providing a Pd or Ni comprising catalyst;
providing an aprotic solvent;
providing a carboxylic acid;
combining the first monomer, second monomer, catalyst, solvent and carboxylic acid as a polymerization mixture; and
heating the polymerization mixture in excess of 120° C., wherein at least one of the first monomers or second monomers is substituted with hydrogen reactive functionalities and at least one of the first or second monomers is substituted with non-hydrogen reactive functionalities, wherein the non-hydrogen reactive functionalities are Cl, Br, I, OTs, OTf, CN, OCN, SCN, wherein the polymerization mixture is free of a phosphine ligand, and wherein the ratio of the hydrogen reactive functionalities and the non-hydrogen reactive functionalities permits a degree of polymerization in excess of four.

13. The method of claim 12, wherein the first monomer comprises the structure:

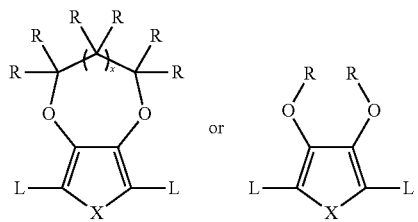

where x is 0 to 3; L is independently H, Cl, Br, I, OTs, OTf, CN, OCN, SCN, or other pseudohalide, X is S, Se, Te, O, or NR; R is independently H, alkyl, aryl, substituted alkyl, or substituted aryl, oligoether, aminoalkyl, hydroxyalkyl, alkoxyalkyl, acyloxyalkyl, HOS(O)$_2$alkyl, HOC(O)alkyl, (HO)$_2$P(O)alkyl, aminoaryl, hydroxyaryl, alkoxyaryl, acyloxyaryl, HOS(O)$_2$aryl, HOC(O)aryl or (HO)$_2$P(O)aryl, —(CH$_2$)$_m$—YC(O)R$^2$, —(CH$_2$)$_m$—C(O)YR$^2$, —(CH$_2$)$_m$—O—(CH$_2$)$_v$YC(O)R$^2$, —(CH$_2$)$_m$—O—(CH$_2$)$_w$C(O)YR$^2$, —(CH$_2$)$_m$—OCH$_z$(CH$_3$)$_y$[(CH$_2$)$_w$YC(O)R$^2$]$_{3-z}$, —(CH$_2$)$_m$—OCH$_z$(CH$_3$)$_y$[(CH$_2$)$_w$C(O)YR$^2$]$_{3-z}$, or two R groups on adjacent carbons in combination are alkylene, arylene, substituted alkylene, or substituted arylene; m is 1 to 8; y is 0 to 2; z is 0 to 2; y+z is 0 to 2; w is 1 to 8; v is 2 to 8; Y is O, S, or NR$^3$, R$^2$ is a straight chained, branched chain, cyclic or substituted cyclic alkyl group of 1 to 12 carbons; and R$^3$ is a straight chained, branched chain, cyclic or substituted cyclic alkyl group of 1 to 6 carbons.

14. The method of claim 12, wherein the second monomer comprises ethene, carbazole, fluorene, benzothiadiazole, thiadiazoloquinoxaline, quinoline, quinoxaline, thienothiadiazole, thienopyrazine, pyrazinoquinoxaline, benzobisthiadiazole, thiadiazolothienopyrazine, thiophene, pyrrole, furan, selenophene, telurophene, thieno[3,2-b]thiophene, dithieno[3,2-b:2',3'-d]thiophene, benzo[c][1,2,5]thiadiazole, benzo[c][1,2,5]-oxadiazole, benzo[d][1,2,3]triazole, pyrido[3,4-b]pyrazine, cyanovinylene, thiazolo[5,4-d]thiazole, 1,3,4-oxadiazole, 1,3,4-thiadiazole, 1,3,4-triazole, pyrrolo[3,4-c]pyrrole-1,4-dione, 2,2'-bithiazole, [1,2,5]thiadiazole-[3,4-c]pyridine, thieno[3,4-b]pyrazine, [1,2,5]oxadiazolo[3,4-c]pyridine, dicyanovinylene, benzo[1,2-c;4,5-c']bis[1,2,5]thiadiazole, [1,2,5]thiadiazolo[3,4-g]quinoxaline, cyclopentadi-thiophene-4-one, 4-dicyanomethylenecyclopentadithiolene, benzo[c]thiophene, isoindigo, indigo, 4,4'-bis(alkyl)-[6,6'-bithieno[3,2-b]pyrrolylidene]-5,5'(4H,4'H)-dione, phenanthrene, phenanthrene-9,10-dione, benzo[1,2-b:6,5-b']dithiophene-4,5-dione, napthalenediimide, perylenediimide, any aromatic of the structure:

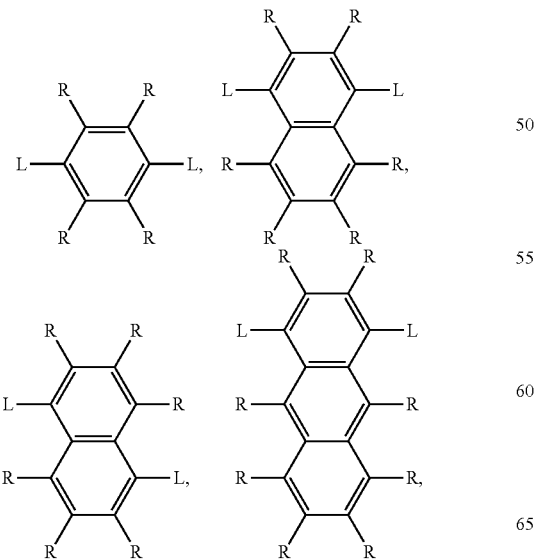

-continued

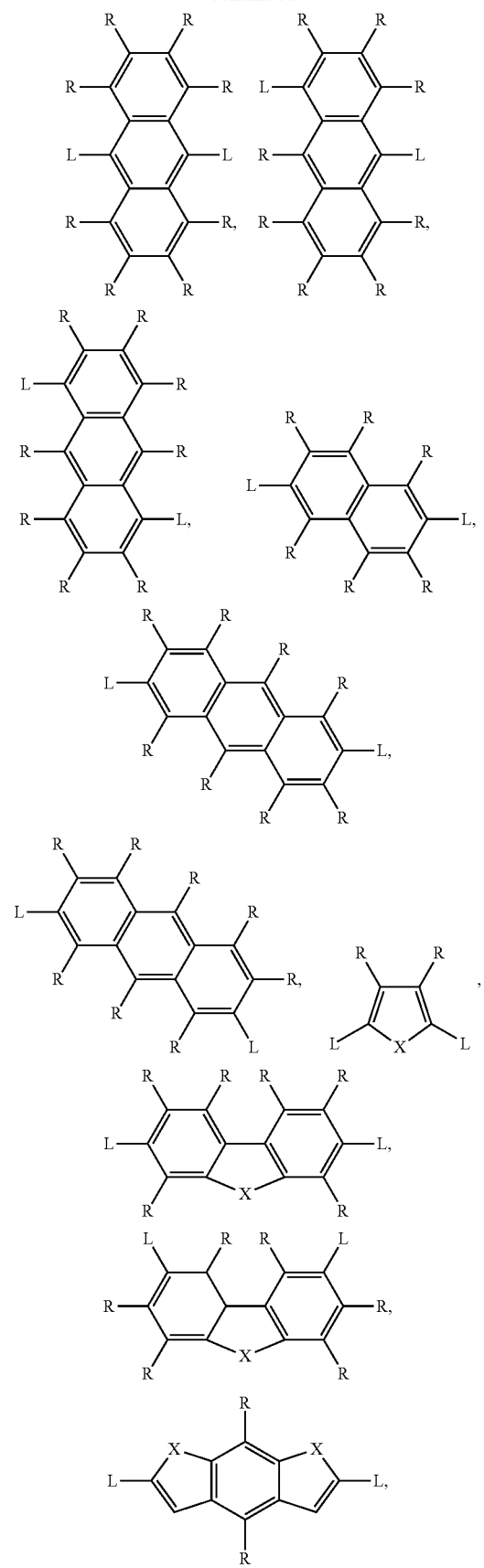

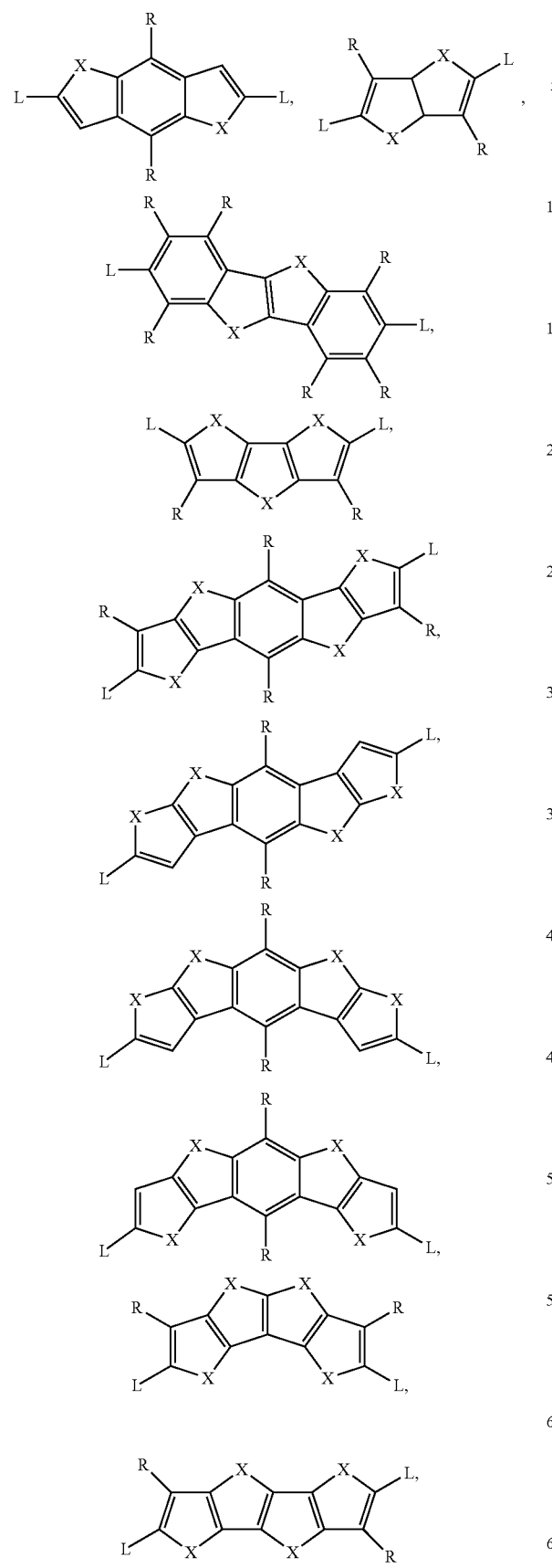
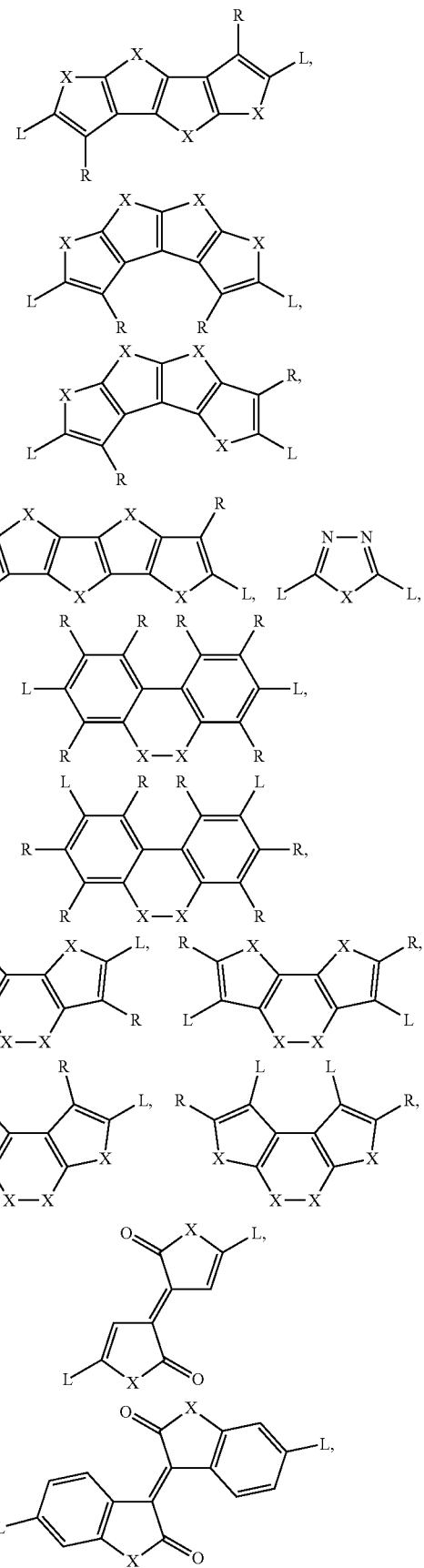

-continued

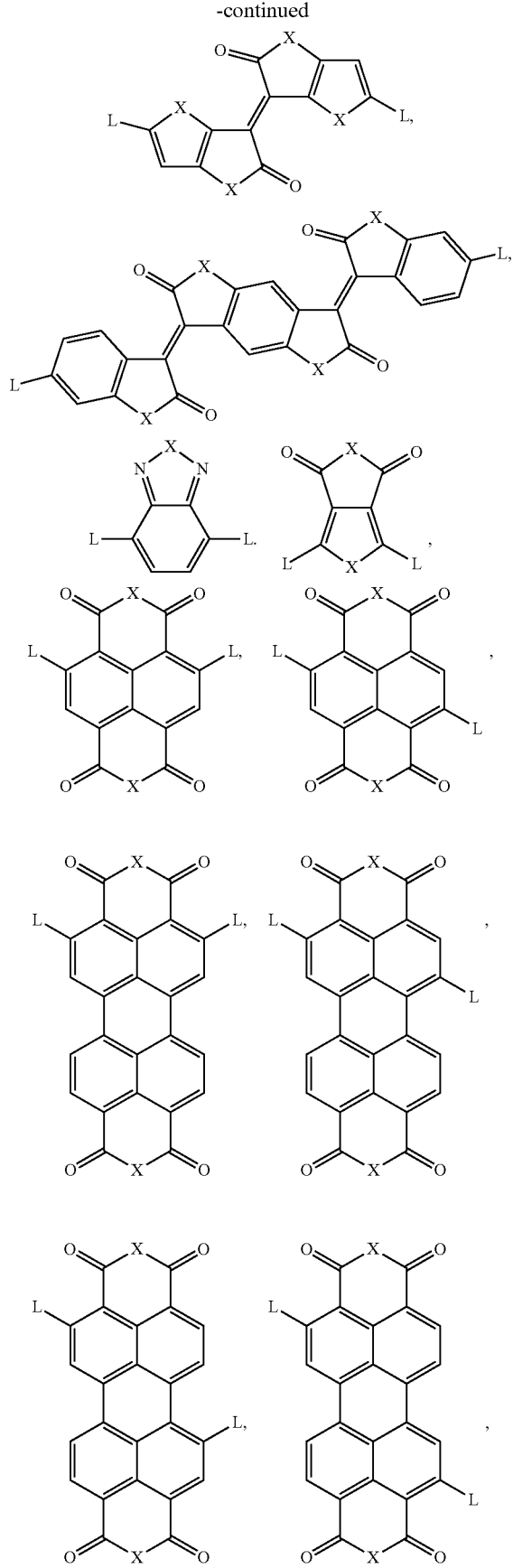

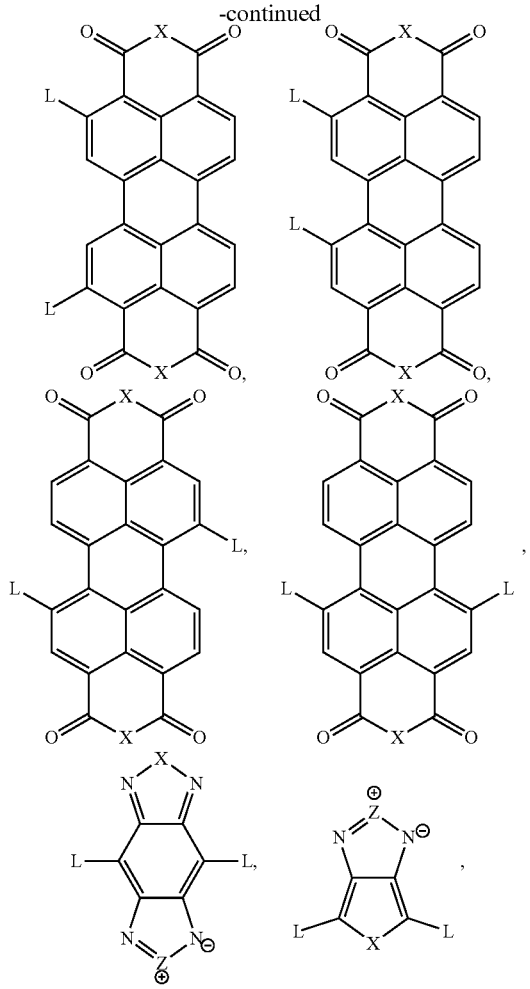

or any oligomers thereof, where: L is independently H, Cl, Br, I, OTs, OTf, CN, OCN, SCN, or other pseudohalide; X is NR', PR', S, O, Se, Te, $CR_2$, $SiR'_2$, $GeR'_2$, BR', or $SO_x$ where x=1 or 2; Z is NR', PR', S, O, Se, or Te; R' is independently H, $C_1$-$C_{30}$ alkyl, $C_2$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, $C_1$-$C_{30}$ hydroxyalkyl, $C_6$-$C_{14}$ hydroxyaryl, $C_7$-$C_{30}$ hydroxyarylalkyl, $C_3$-$C_{30}$ hydroxyalkenyl, $C_3$-$C_{30}$ hydroxyalkynyl, $C_8$-$C_{30}$ hydroxyarylalkenyl, $C_8$-$C_{30}$ hydroxyarylalkynyl, $C_3$-$C_{30}$ polyether, $C_3$-$C_{30}$ polyetherester, $C_3$-$C_{30}$ polyester, $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$alkylsulfonic acid, $C_3$-$C_{30}$alkylsulfonate salt, $C_1$-$C_{30}$ alkylcarboxylate salt, $C_1$-$C_{30}$ alkylthiocarboxylate salt, $C_1$-$C_{30}$ alkyldithiocarboxylate salt or $C_3$-$C_{30}$ alkyl $C_1$-$C_4$ trialkyammonium salt; and R is independently H, $C_1$-$C_{30}$ alkyl, $C_2$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, hydroxy, $CO_2H$, $C_2$-$C_{30}$ alkylester, $C_7$-$C_{15}$ arylester, $C_8$-$C_{30}$ alkylarylester, $C_3$-$C_{30}$ alkenylester, $C_3$-$C_{30}$ alkynylester, $NH_2$, $C_1$-$C_{30}$ alkylamino, $C_6$-$C_{14}$ arylamino, $C_7$-$C_{30}$ (arylalkyl)amino, $C_2$-$C_{30}$ alkenylamino, $C_2$-$C_{30}$ alkynylamino, $C_8$-$C_{30}$ (arylalkenyl)amino, $C_8$-$C_{30}$ (arylalkynyl)amino, $C_2$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl) amino, $C_{15}$-$C_{30}$ aryl(arylalkyl)amino, $C_8$-$C_{30}$ alkenyl (aryl)amino, $C_8$-$C_{30}$ alkynyl(aryl)amino C(O)NH$_2$ (amido), $C_2$-$C_{30}$ alkylamido, $C_7$-$C_{14}$ arylamido, $C_8$-$C_{30}$ (arylalkyl)amido, $C_2$-$C_{30}$ dialkylamido, $C_{12}$-$C_{28}$ diarylamido, $C_8$-$C_{30}$ aryl(alkyl)amido, $C_{15}$-$C_{30}$ di(arylalkyl) amido, $C_9$-$C_{30}$ alkyl(arylalkyl)amido, $C_{16}$-$C_{30}$ aryl(arylalkyl)amido, thiol, $C_1$-$C_{30}$ hydroxyalkyl, $C_6$-$C_{14}$ hydroxyaryl, $C_7$-$C_{30}$ hydroxyarylalkyl, $C_3$-$C_{30}$ hydroxyalkenyl, $C_3$-$C_{30}$ hydroxyalkynyl, $C_8$-$C_{30}$ hydroxyarylalkenyl, $C_8$-$C_{30}$ hydroxyarylalkynyl, $C_3$-$C_{30}$ polyether, $C_3$-$C_{30}$ polyetherester, $C_3$-$C_{30}$ polyester, $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$alkylsulfonate salt, $C_1$-$C_{30}$ carboxylate salt, $C_1$-$C_{30}$ thiocarboxylate salt, $C_1$-$C_{30}$ dithiocarboxylate salt, or $C_3$-$C_{30}$ alkyl$C_1$-$C_4$ trialkyammonium salt.

15. The method of claim 12, wherein the aprotic solvent comprises dimethylformamide (DMF), DMAc, N-methylpyrolidone (NMP), hexamethylphosporamide (HMPA), dimethylsulfoxide (DMSO), or propylene carbonate.

16. The method of claim 12 wherein the catalyst is palladium diacetate, palladium di-trifluoroacetate, or Bis (dibenzylideneacetone)palladium(0).

17. The method of claim 12, wherein the carboxylic acid is pivalic acid or other aliphatic carboxylic acid.

18. The method of claim 12, wherein the polymerization mixture is free of a phase transfer agent.

19. The method of claim 12, wherein first monomer is 3,3-bis((2-ethylhexyloxy)methyl)-3,4-dihydro-2H-thieno[3,4-b][1,4]dioxepine, 6,8-dibromo-3,3-bis((2-ethylhexyloxy)methyl)-3,4-dihydro-2H-thieno[3,4-b][1,4]dioxepine, and/or 6-bromo-3,3-bis((2-ethylhexyloxy)methyl)-3,4-dihydro-2H-thieno[3,4-b][1,4]dioxepine.

20. The method of claim 12, wherein the second monomer is 1,4-dibromobenzene or 4,7-dibromo-2,1,3-benzothiadiazole.

* * * * *

UNITED STATES PATENT AND TRADEMARK OFFICE
CERTIFICATE OF CORRECTION

PATENT NO. : 9,790,326 B2  
APPLICATION NO. : 14/897063  
DATED : October 17, 2017  
INVENTOR(S) : John R. Reynolds et al.

It is certified that error appears in the above-identified patent and that said Letters Patent is hereby corrected as shown below:

In the Specification

Column 3,
Line 62, "hexamethylphosporamide" should read --hexamethylphosphoramide--.

Column 12,
Line 48, "higher temperature" should read --higher temperatures--.

Column 16,
Line 51, "MgSO4" should read --$MgSO_4$--.
Line 54, "(300 MHz, CDCl3, δ):" should read --(300 MHz, $CDCl_3$, δ):--.
Line 56, "for C25H42O4SBr2" should read --for $C_{25}H_{42}O_4SBr_2$--.
Line 58, "MHz, CDCl3" should read --MHz, $CDCl_3$--.
Line 61, "C25H43O4SBr" should read --$C_{25}H_{43}O_4SBr$--.

Column 17,
Line 9, "(300 MHz, CDCl3" should read --(300 MHz, $CDCl_3$--.

Column 18,
Line 18, "$D_M$ = 1.19" should read --$Đ_M$ = 1.19--.

Column 19,
Line 9, "$D_M$ = 2.03" should read --$Đ_M$ = 2.03--.

Signed and Sealed this
Twelfth Day of June, 2018

Andrei Iancu
*Director of the United States Patent and Trademark Office*